US012559974B2

(12) United States Patent
Costello

(10) Patent No.: US 12,559,974 B2
(45) Date of Patent: Feb. 24, 2026

(54) LATCH TAMPERING INDICATOR

(71) Applicant: Timothy J. Costello, South Bend, IN (US)

(72) Inventor: Timothy J. Costello, South Bend, IN (US)

( * ) Notice: Subject to any disclaimer, the term of this patent is extended or adjusted under 35 U.S.C. 154(b) by 413 days.

(21) Appl. No.: 17/582,365

(22) Filed: Jan. 24, 2022

(65) Prior Publication Data

US 2023/0235595 A1 Jul. 27, 2023

(51) Int. Cl.
*E05B 39/00* (2006.01)

(52) U.S. Cl.
CPC .................................... *E05B 39/00* (2013.01)

(58) Field of Classification Search
CPC ...... E05B 39/00; E05B 39/025; E05B 15/022; E05B 39/02; G09F 3/00; G09F 3/0376; G09F 3/03; Y10S 292/38; E05C 1/04; Y10T 292/481025; Y10T 292/1028; Y10T 292/1029
USPC .......................................................... 292/243
See application file for complete search history.

(56) References Cited

U.S. PATENT DOCUMENTS 67,549 A 8/1867 Hunter
79,801 A * 7/1868 Adams ................ E05B 65/0864 292/307 R
295,464 A 3/1884 Topham
355,961 A * 1/1887 Allen ...................... E05B 39/02 292/287
591,407 A * 10/1897 Lee et al. .............. G09F 3/0352 292/307 R
777,686 A 12/1904 Moore et al.
777,687 A 12/1904 Moore et al.
995,279 A 6/1911 Neblung
1,605,638 A * 11/1926 Baruch ................. G09F 3/0323 292/307 R
1,615,225 A * 1/1927 Johnson .................. G09F 3/037 292/307 R
2,228,326 A * 1/1941 Rau ....................... G09F 3/0323 292/307 R
2,530,899 A * 11/1950 Mueller .................. F16K 35/10 292/307 R
3,069,217 A 12/1962 Kors
(Continued)

FOREIGN PATENT DOCUMENTS

BR 202016009120 U2 * 12/2017 ............... G09F 3/03
CN 102797387 A * 11/2012 ............ G09F 3/0311
(Continued)

OTHER PUBLICATIONS

Davinci Lock, Secure Vacants—Release Overlocks, https://www.davincilock.com, Feb. 2, 2022, 3 pages.
(Continued)

*Primary Examiner* — Steven A Tullia

(74) *Attorney, Agent, or Firm* — Barnes & Thornburg LLP

(57) ABSTRACT

A device for indicating that a latch has been opened or tampered with includes a base, a head and a body having a frangible section. The body connects the base and the head. In use, the device is inserted into a latch in the closed or latched position. The device is positioned such that opening or unlatching the latch breaks or otherwise severs the frangible section, thereby separating the base from the head.

13 Claims, 22 Drawing Sheets

(56) References Cited

U.S. PATENT DOCUMENTS 3,600,027 A * 8/1971 Noland .............. B65D 63/1027 292/322
3,768,849 A * 10/1973 Sytko .................... G09F 3/0323 292/327
3,814,298 A * 6/1974 Hansen ................ A62C 13/003 292/322
3,838,876 A * 10/1974 Haven ..................... E05B 85/08 292/336.3
3,862,775 A * 1/1975 Gudmundsen .......... E05B 39/02 292/327
3,897,162 A * 7/1975 Havark ................... F16B 19/08 292/307 R
3,955,842 A * 5/1976 Edwards ................ B65D 27/30 292/307 R
4,008,914 A * 2/1977 Anderson ............ A44B 19/301 292/307 R
4,106,801 A * 8/1978 De Lima Castro Neto ................ G09F 3/20 292/307 R
4,226,101 A * 10/1980 Lee ........................... E05C 3/08 70/141
4,512,599 A * 4/1985 De Lima Castro Netto ................ G09F 3/0305 292/307 R
4,602,405 A * 7/1986 Sturman ............ B65D 33/2541 292/307 R
4,626,009 A * 12/1986 Burnett ............... F16B 37/0857 292/327
4,658,481 A * 4/1987 Seyler ................... F16B 21/088 292/307 R
4,782,564 A * 11/1988 Sloan ..................... A62C 13/76 24/453
4,793,641 A * 12/1988 Sokol ...................... G09F 3/037 292/322
5,118,148 A * 6/1992 De Lima Castro Netto ................ G09F 3/20 292/307 R
5,603,184 A 2/1997 Campbell et al.
5,924,314 A * 7/1999 Cernansky .......... E05B 17/2084 70/56
6,360,411 B1 * 3/2002 Bortz ................. A44B 11/2576 24/625
6,477,872 B1 * 11/2002 Denton, Jr. ............. E05B 67/36 70/80
6,527,312 B1 * 3/2003 Jackovino ............... E05B 39/02 70/56
6,533,335 B2 * 3/2003 Hudson ................ A44B 19/301 385/5
6,769,724 B2 8/2004 Krispin
6,893,060 B2 * 5/2005 Ng ........................ E05B 45/083 70/417
7,021,826 B2 * 4/2006 Benjamins ............ G09F 3/0311 292/307 R
7,042,354 B2 * 5/2006 Auerbach ............. G09F 3/0317 340/568.2
7,044,509 B2 5/2006 Radel
7,336,170 B2 * 2/2008 Auerbach ............. G09F 3/0335 340/568.2
7,338,209 B2 * 3/2008 Winpenny ............. B65D 27/30 292/307 R
7,988,209 B2 * 8/2011 Hudson ................. G09F 3/0305 292/307 R
8,028,852 B2 * 10/2011 London ................. F16L 57/005 220/295
8,398,129 B2 * 3/2013 Hale ...................... B65D 55/10 292/307 R
8,485,572 B2 * 7/2013 Nazzari ................. G09F 3/0358 292/307 R
8,672,370 B2 * 3/2014 Abel ....................... E05C 3/042 292/218
8,960,737 B2 * 2/2015 Nazzari ................. G09F 3/0382 292/307 R
9,822,558 B1 * 11/2017 Blankenship ......... E05B 13/002
10,017,959 B2 * 7/2018 Perrins ................ E05B 65/0021
10,036,410 B2 * 7/2018 Lesecq ................ F16B 19/1081
10,662,673 B2 5/2020 Jian et al.
10,737,844 B2 * 8/2020 Anderson .......... B65D 33/2508
11,847,940 B2 * 12/2023 Kucksdorf ............ G09F 3/0317
2004/0083782 A1 * 5/2004 Lantz ................... A44B 19/301 70/423
2007/0040393 A1 * 2/2007 McLaughlin ........... F16G 11/04 292/284
2008/0127687 A1 * 6/2008 Henson ................. E05B 67/383 70/129
2008/0143123 A1 * 6/2008 DeWalch ............... G01R 11/24 70/164
2008/0264117 A1 * 10/2008 Dewalch ............... G09F 3/0329 70/164
2008/0289379 A1 * 11/2008 Martin ...................... E05B 9/04 70/375
2008/0290670 A1 * 11/2008 DeWalch .............. G09F 3/0317 70/164
2010/0000270 A1 * 1/2010 DeWalch ................ G09F 3/037 70/52
2012/0103034 A1 * 5/2012 Shartel .................. E05B 13/101 411/190
2013/0247624 A1 * 9/2013 DeWalch .............. F16B 31/021 70/164
2016/0146239 A1 * 5/2016 Nazzari ................. F16B 41/005 70/232
2017/0145716 A1 * 5/2017 Ryan ......................... E05C 1/04
2021/0348421 A1 * 11/2021 Haagendrup ....... E05B 47/0002
2023/0235595 A1 * 7/2023 Costello .................... E05C 1/04 292/307 R

FOREIGN PATENT DOCUMENTS

CN 203570001 U 4/2014
CN 109138650 A * 1/2019 ............. E05B 65/52
CN 111827798 A * 10/2020 ............... E05C 1/04
DE 102021128875 A1 * 5/2023 ......... E05B 17/2019
EP 2461308 A2 * 6/2012 ............ G09F 3/0311
GB 1543380 A * 4/1979 ........... A44B 19/301
GB 2064638 A * 6/1981 ............. E05B 39/02
GB 2079362 A * 1/1982 ........... A44B 19/301
JP H062460 A * 6/1996 ............... E05C 1/06
WO 8704484 7/1987
WO WO-2006059154 A2 * 6/2006 ........... G09F 3/0305
WO WO-2011086453 A1 * 7/2011 ............. G02C 11/00
WO WO-2011143687 A1 * 11/2011 ........... E05B 13/002

OTHER PUBLICATIONS

Davinci Lock, "The DaVinci Lock System Enables Contactless Removal of Locks", https://www.davincilock.com/Account/HowItWorks, Feb. 2, 2022, 2 pages.
Davinci Lock, "DaVinci Lock Store", 11 pages.
PTI Security Systems, "Door Boss: Individual Door Locking and Monitoring System", 1 page.
PTI Security Systems, "Door Boss: Unlock The Power Of the Smart Lock", 3 pages.
PTI Security Systems, "The Ultimate Combination in Individualized Unit Security", 2 pages.
PTI Security Systems, "The Ultimate Guide to Overlocking for Self-Storage Operations", 15 pages.
Chateau Products, "Keyed Alike Management Locks", p. 77.
PTI Security Systems, "Boss The Industry's First Completely Wireless Electronic Smart Lock", https://ptisecurity.com/products/doorboss, Apr. 26, 2022, 2 pages.
PTI Security Systems, "Boss Differentiate Your Facility With The Power of DoorBoss", https://ptisecurity.com/doorboss-info-sheet, Apr. 26, 2022, 1 page.
PTI Security Systems, "5 Benefits of Individual Unit-Door Security Technology for Self-Storage Operators", https://ptisecurity.com/5-benefits-of-individual-unit-door-security-technology-for-self-storage-operators, Apr. 26, 2022, 2 pages.

(56) References Cited

OTHER PUBLICATIONS

PTI Security Systems, "Boss Unlock the Power of DoorBoss", https://ptisecurity.com/doorboss_benefits, Apr. 26, 2022, 1 page.
PTI Security Systems, "A to Z on Overlocking", https://ptisecurity.com/overlocking_guide, Apr. 26, 2022, 1 page.

* cited by examiner

LATCH TAMPERING INDICATOR

The present invention relates to latch mechanisms, and, in particular, to devices for providing a visual indication that a latch, lock, or similar closure mechanism has been opened or otherwise tampered with.

BACKGROUND AND SUMMARY OF THE INVENTION

Various latches, locks and other closure mechanisms are known. For example, sliding latch mechanisms that have a fixed member and a moveable member for engaging a retaining member are known and used in various applications. One such application is on overhead or garage doors. In this type of application, the latch is fixed to either the door or to a stationary structure, and the retaining member is fixed to or integrate with the other of the door or stationary structure. The moveable member of the latch can be moved from a latched or engaged position in which it engages the retaining member, thereby preventing movement of the door relative to the structure, to an unlatched or opened position, in which the moveable member is spaced apart from the retaining member, thereby permitting movement of the door relative to the structure. In certain instances, it may be desirable to know if such a latch has been opened or tampered with, such as by moving the latch from the engaged or latched position to the opened or unlatched position.

In one embodiment of the present invention a device for indicating that a latch has been opened or tampered with includes a base, a retaining member, a head, and a body. The base includes a first surface, a second surface, and a wall extending from the first surface to the second surface. The wall has a curved section and a flat section. The retaining member extends from the base. The head has a first surface and a second surface opposite the first surface. At least one of the first surface of the head and the second surface of the head has an area larger than at least one of the first surface of the base or the second surface of the base. The body has a first section having a first end and a second end, and a second section having a first end and a second end. The first end of the first section of the body is connected to the first surface of the head, the second end of the first section of the body is connected to the first end of the second section of the body, and the second end of the second section of the body is connected to the first surface of the base.

In one embodiment, the curved section of the wall of the base is adjacent the flat section of the wall of the base. In another embodiment, the wall of the base includes a second flat section and a second curved section. In certain embodiments, the flat sections of the wall of the base are parallel.

In other embodiments, the retaining member extends from the flat section of the wall of the base. In certain embodiments, the flat section of the wall of the base includes a recessed area, and the retaining member extends from the recessed area. According to another embodiment, the wall of the base includes a second flat section, and the device includes a second retaining member extending from the second flat section of the wall of the base. In one embodiment, the retaining member includes at least one resilient member.

In some embodiments of the invention, the first section of the body has a larger diameter than the second section of the body. In one embodiment, the second section of the body is frangible. In other embodiments, the second section of the body includes at least one elongated member.

In one embodiment of the present invention, a device for indicating that a latch has been opened or tampered with includes a base, a head, and a body connecting the base to the head. The body has a frangible section.

In one embodiment, the device includes a retaining member connected to the base. In certain embodiments, the retaining member includes at least one resilient member.

In one embodiment, the body has a non-frangible section. In another embodiment, the non-frangible section of the body is connected to the head and to the frangible section. In other embodiments, the non-frangible section of the body is connected to the base and to the frangible section.

In certain embodiments, the base has a surface, and the head has a surface having an area greater than the area of the surface of the base.

In one embodiment, the base is compressible.

In one embodiment of the present invention, a device for indicating that a latch has been opened or tampered with has a base, a head and a body. The latch with which the device is used has a fixed member having an opening, and a moveable member having an opening. The openings are aligned when the latch is in the latched positioned and are not aligned when the latch is in the open position The base of the device is configured to be inserted through the opening in the fixed member and the opening in the moveable member. The body of the device connects the base to the head. The body has a frangible section positioned relative to the base and the head so as to be located in the opening of the fixed member and the opening of the moveable member when the base is inserted through the opening in the fixed member and the opening in the moveable member.

In one embodiment, the head is larger than the opening in the fixed member and the opening in the moveable member.

In another embodiment, movement of the moveable member relative to the fixed member to move the latch from the latched position to the open position causes the moveable member to break the frangible section and separate the base from the head.

These and other features of the present invention will be apparent to those of ordinary skill in the art from the following Detailed Description of Embodiments of the Invention and the accompanying drawings.

DETAILED DESCRIPTION OF EMBODIMENTS OF THE INVENTION

Figure 1:
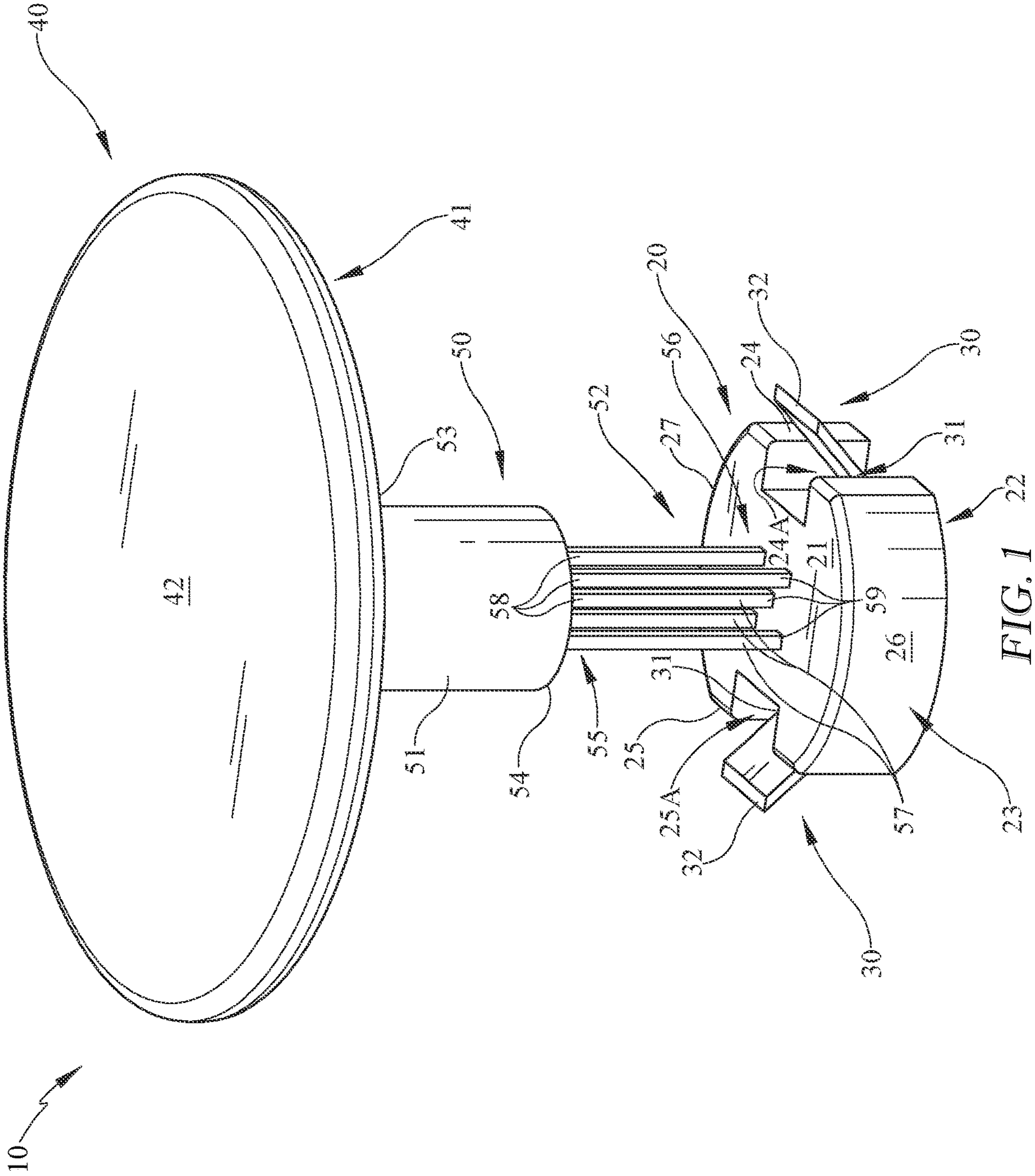
FIG. 1 is a perspective view of a device for indicating that a latch has been opened or tampered with according to one embodiment of the present invention.
Figure 2:
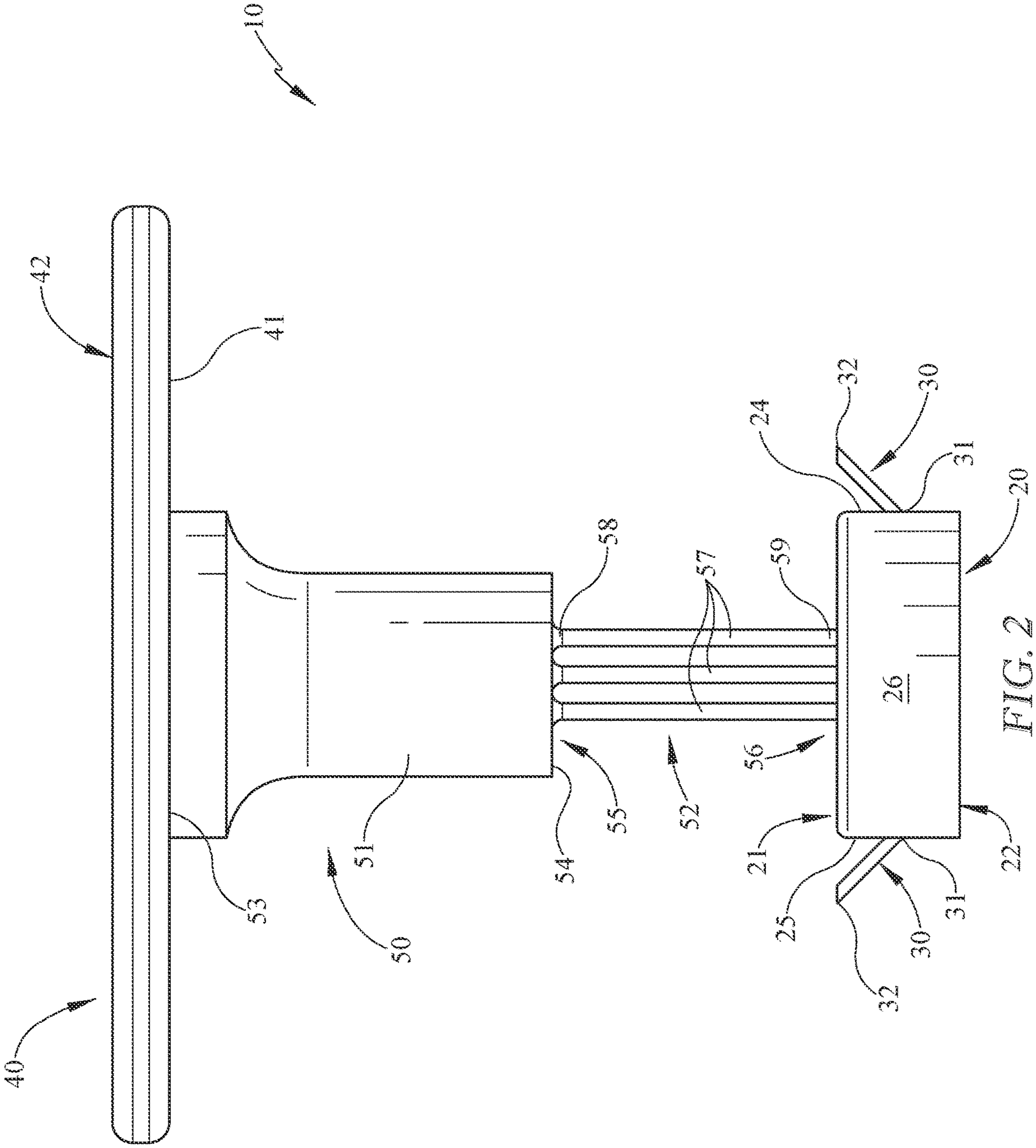
FIG. 2 is an elevational view of the device shown in FIG. 1.
Figure 3:
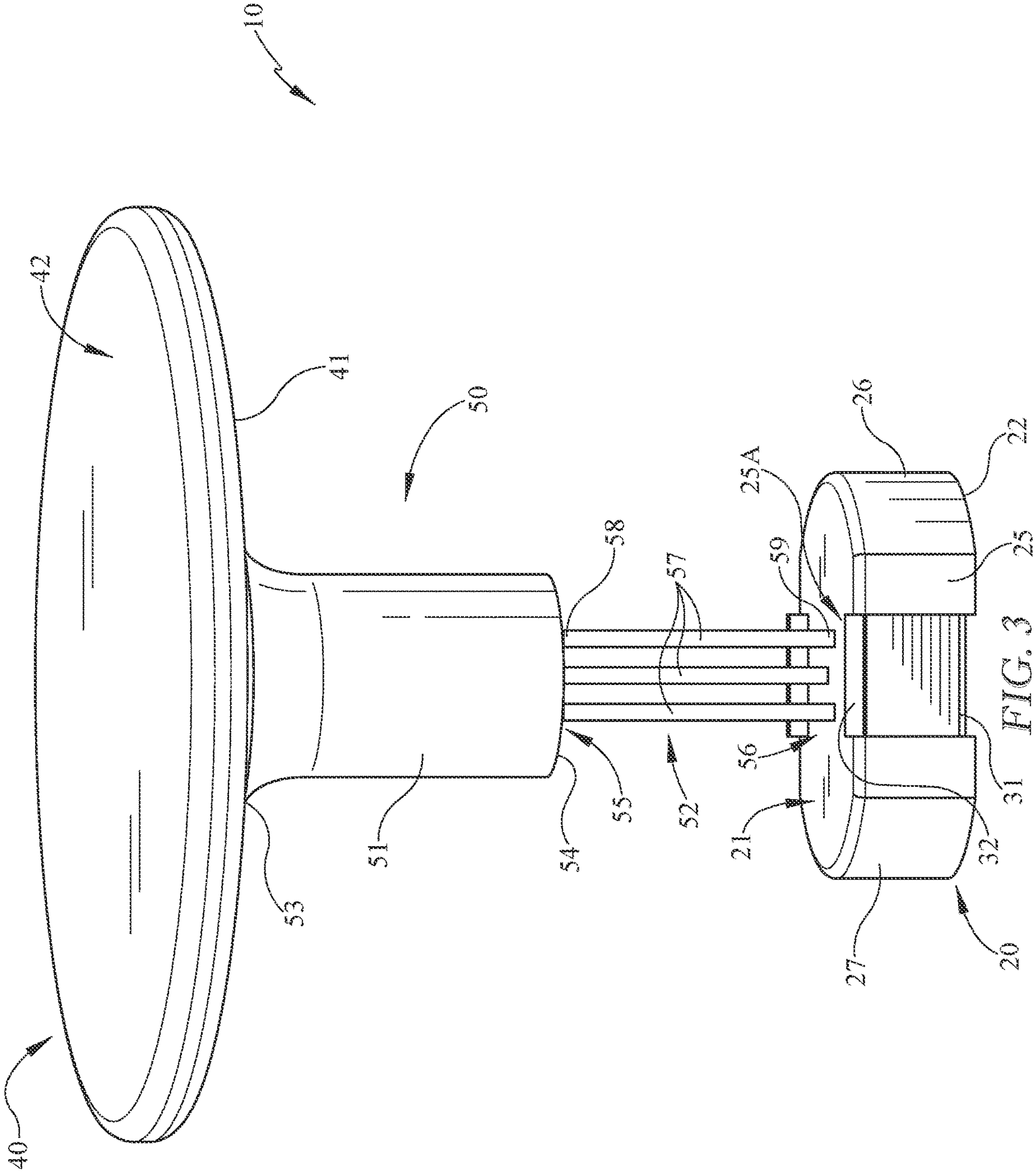
FIG. 3 is an elevational view of the device shown in FIG. 1 rotated 90 degrees relative to FIG. 2.
Figure 4:
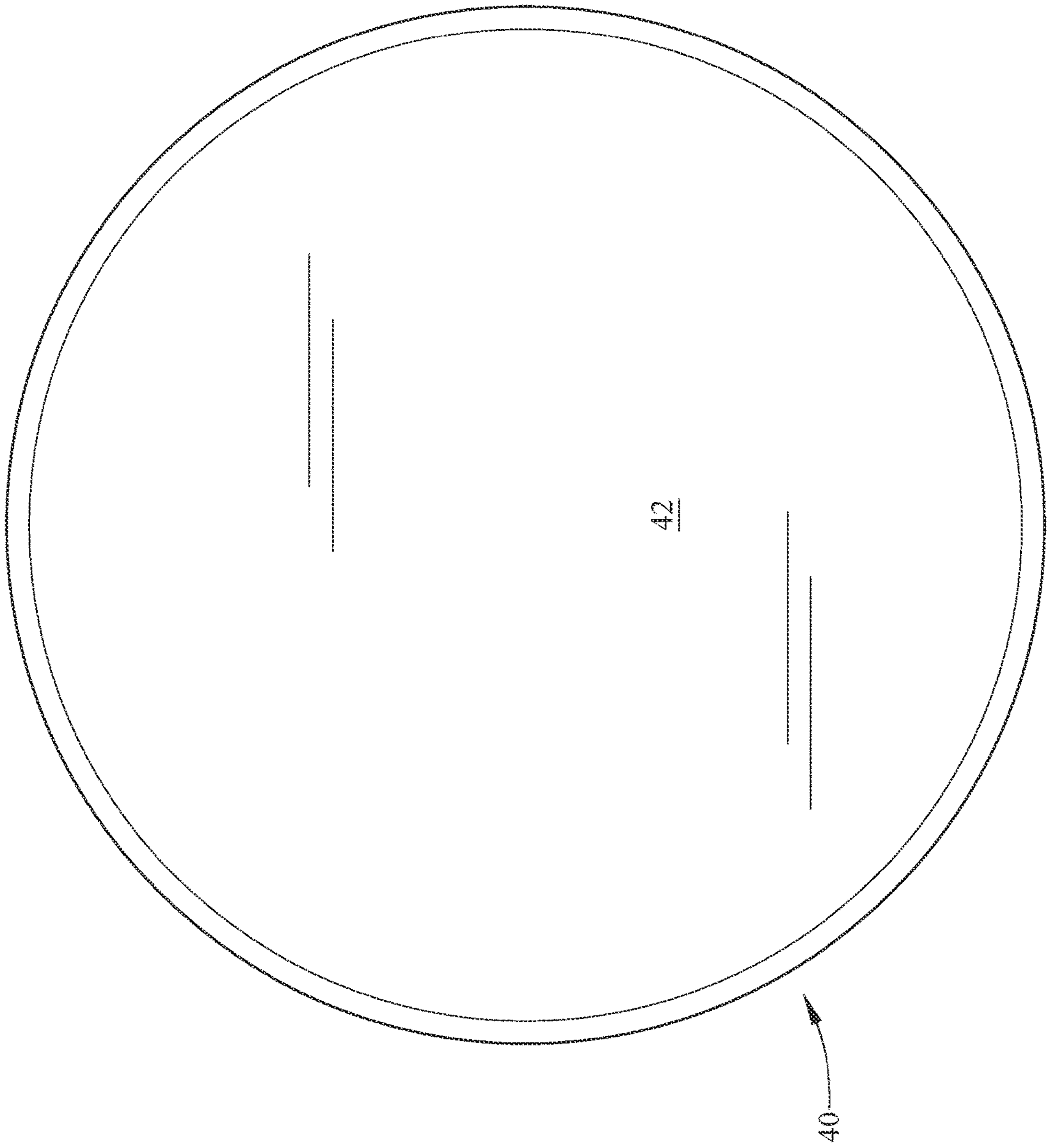
FIG. 4 is a top plan view of the device shown in FIG. 1.
Figure 5:
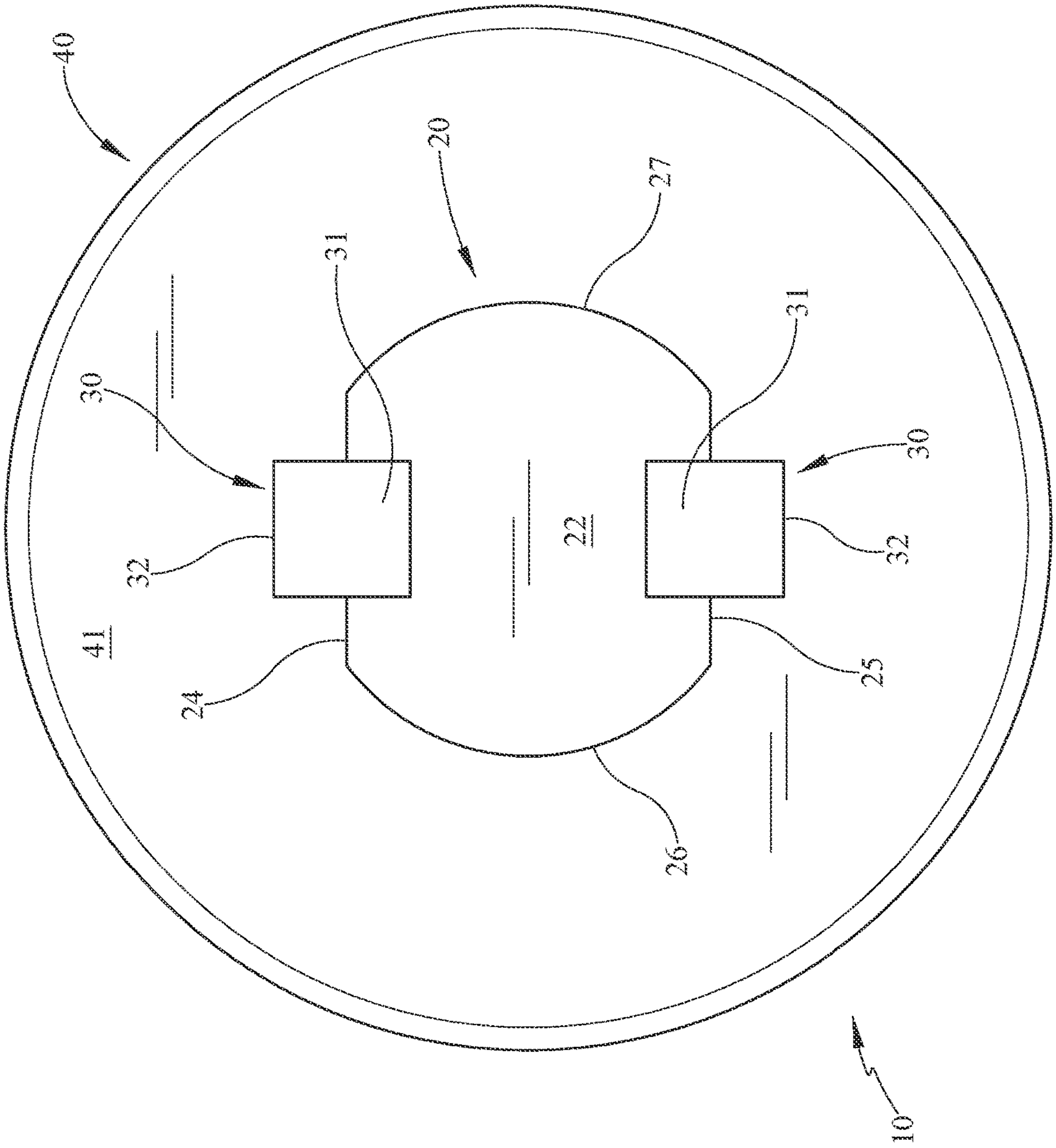
FIG. 5 is a bottom plan view of the device shown in FIG. 1.

FIG. 1 is a perspective view of a device 10 for indicating that a latch has been opened or tampered with according to one embodiment of the present invention. In the embodiment shown, device 10 generally includes a base 20, two retaining members 30, a head 40, and a body 50.

In the embodiment shown, base 20 includes a first surface 21, a second surface 22, and a wall 23 extending from first surface 21 to second surface 22. First surface 21 is parallel to second surface 22. Wall 23 has a first flat section 24, a second flat section 25, a first curved section 26 and a second curved section 27. First flat section 24 and second flat section 25 are on opposite sides of base 20 and are parallel to one another. First flat section 24 has a recessed area or notch 24A, and second flat side 25 has a recessed area or notch 25A. First curved section 26 and second curved section 27 are on opposite sides of base 20.

In the embodiment shown, each retaining member 30 extends from one of either flat section 24 or flat section 25 of base 20. Each retaining member 30 includes a first end 31 connected to one of flat section 24 or flat section 25 in or at notches 24A or 25A and a second or free end 32. Retaining members 30 are resilient members. Force can be applied to retaining members 30 to push them toward base 20 and, in the embodiment shown, toward notches 24A and 25A. When the force is removed, retaining members 30 will return to their original position shown in FIG. 1.

In the embodiment shown, head 40 includes a first surface 41 and a second surface 42. First surface 41 is parallel to second surface 42. At least one of first surface 41 and second surface 42 of head 40 has an area greater than at least one of first surface 21 or second surface 22 of base 20. In the embodiment shown both first surface 41 and second surface 42 of head 40 have a larger area than both first surface 21 and second surface 22 of base 20.

In the embodiment shown, body 50 has a first section 51 and a second section 52. First section 51 of body 50 has a first end 53 connected to first surface 41 of head 40 and second end 54. Second section 52 of body 50 has a first end 55 connected to second end 54 of first section 51 of body 50 and a second end 56 connected to first surface 21 of base 20. Second section 52 of body 50 is frangible, i.e., second section 52 is fragile or readily or easily broken. One way to make second section 52 frangible is by constructing it from a brittle material. Another way to make second section 52 frangible is by configuring it to have a section having a relatively small cross-section. Other options are also available. Second section 52 of body 50 should be constructed such that it is easily broken upon opening or activating the latch with which device 10 is utilized, as described in greater detail below. In the embodiment shown, second section 52 of body 50 is a plurality of thin, elongated members or posts 57, each of which has a first end 58 connected to second end 54 of first section 51 of body 50 and a second end 59 connected to first surface 21 of base 20. In certain embodiments of the invention, First section 51 of body 50 is non-frangible.

Figure 6:
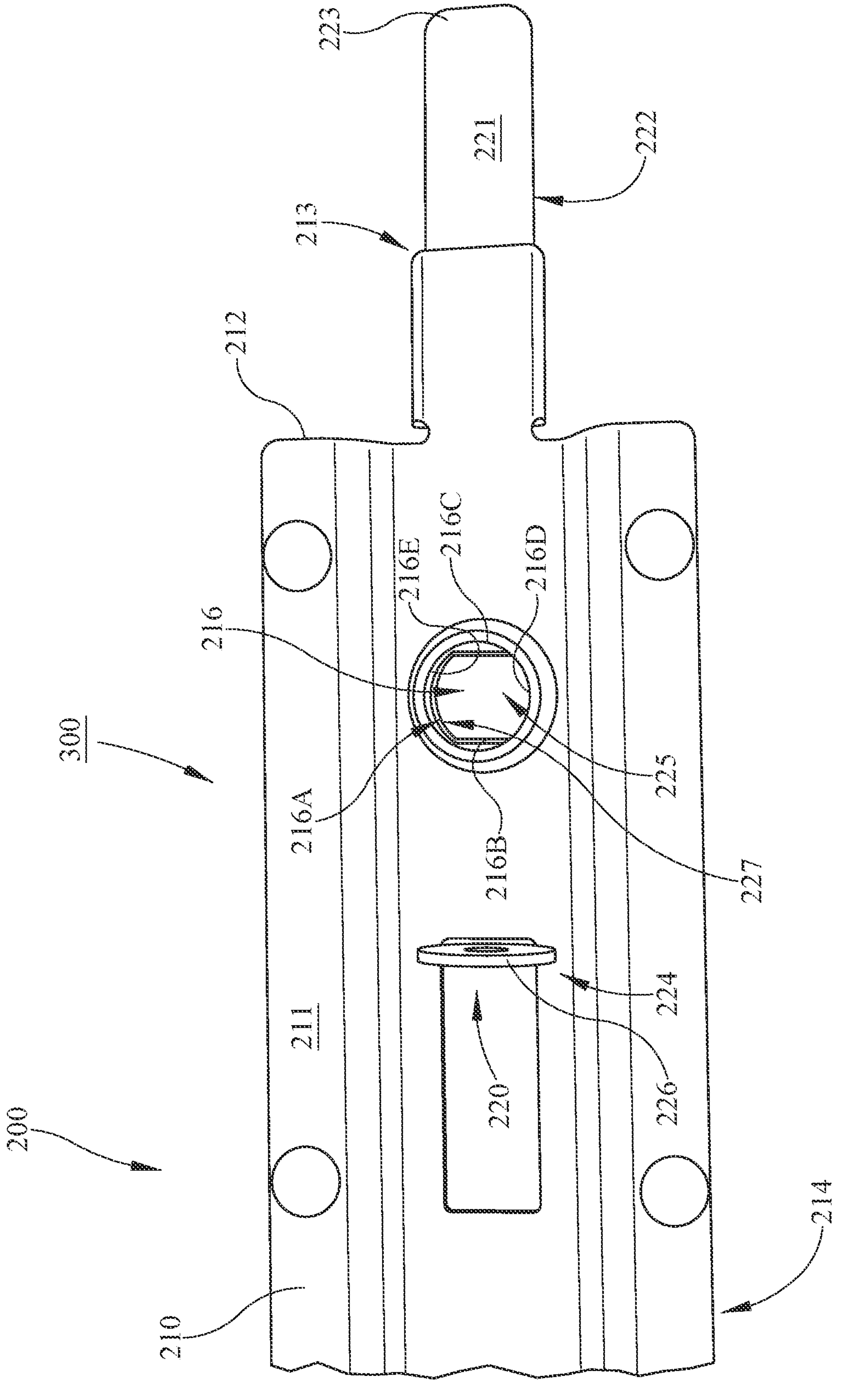
FIG. 6 is a perspective view of a latch in the engaged or latched position.
Figure 7:
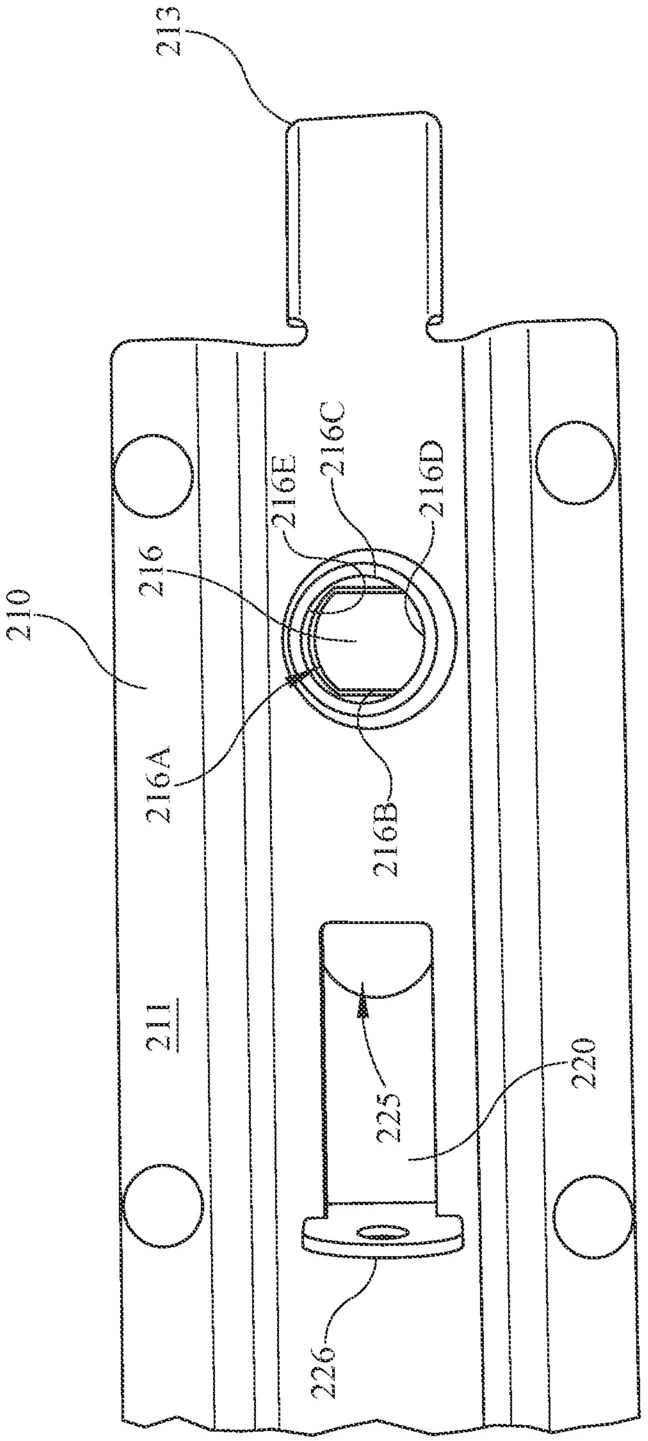
FIG. 7 is a perspective view of the latch shown in FIG. 6 in the opened or unlatched position.

FIG. 6 is a perspective view of a latch 200 in the engaged or latched position. FIG. 7 is a perspective view of latch 200 in the opened or unlatched position. Latch 200 generally includes a first or fixed member 210 and a second or moveable member 220.

Fixed member 210 of latch 200 has a first side 211, a second side 212, a first end 213, a second end 214, a slot or channel 215, and an opening 216. Second side 212 of fixed member 210 may be mounted or connected to a surface 300 of a vehicle, building, or other item. Opening 216 has a perimeter 216A having a first flat section 216B, a second flat section 216C, a first curved section 216D and a second curved section 216E. First flat section 216B and second flat section 216C are on opposite sides of opening 216 and are parallel to one another. First curved section 216D and second curved section 216E are on opposite sides of opening 216.

Moveable member 220 has a first side 221, a second side 222, a first end 223, a second end 224, and an opening 225. Second end 224 of moveable member 220 has a tab or handle 226. Opening 225 has an edge or perimeter 227. Moveable member 220 is sized and configured to fit between second side 212 of fixed member 210 and surface 300 and slide between the engaged or latched position shown in FIG. 6 to the opened or unlatched position shown in FIG. 7.

In the engaged or latched position shown in FIG. 6, first end 223 of moveable member 220 extends beyond first end 213 of fixed member 210 and into a retaining structure 301 on a surface 302 adjoining surface 300. In this position, engagement of moveable member 220 with retaining structure 301 prevents movement of surface 300 and surface 302 relative to one another. Opening 216 in fixed member 210 and opening 225 in moveable member 220 are aligned when latch 200 is in the engaged or latched position shown in FIG. 6.

Latch 200 may be opened or unlatched by sliding moveable member 220 toward second end 224 of fixed member 220. This may be accomplished by, for example pulling or pushing handle 226 of moveable member 220 toward second end 214 of fixed member 210. In this position, first end 223 of moveable member 220 is disengaged from retaining structure 301 and opening 216 in fixed member 210 and opening 225 in moveable member 220 are no longer aligned.

To use device 10, latch 200 is placed in the engaged or latched position shown in FIG. 6. Device 10 is then positioned such that base 20 is adjacent openings 216 and 225 on first side 211 of fixed member 210, with first flat section 24 and second flat section 25 of base 20 aligned with first flat section 216B and second flat section 216C of opening 216, and first curved section 26 and second curved section 27 of base 20 aligned with first curved section 216D and second curved section 216E of opening 216. Base 20 is then inserted through opening 216 in fixed member 210 and opening 225 in moveable member 220.

As base 20 is inserted through openings 216 and 225, retaining members 30 contact perimeter 216A of opening 216 and/or perimeter 227 of opening 225. This contact compresses retaining members 30 toward base 20. When retaining members 30 clear perimeter 227 of opening 225, they return to their original position with second ends 32 spaced apart from base 20. Attempting to remove device 10 from latch 200 by pulling base 20 back through openings 216 and 225 will be prevented by contact between retaining members 30 and second side 222 of moveable member 220. After base 20 clears second side 222 of moveable member 220, device 10 can be rotated so that first flat section 24 and second flat section 25 of base 20 are no longer aligned with first flat section 216B and second flat section 216C of opening 216, and first curved section 26 and second curved section 27 of base 20 are no longer aligned with first curved section 216D and second curved section 216E of opening 216. This misalignment also prevents device 10 from being removed from latch 200 by pulling base 20 back through openings 216 and 225 because doing so will result in contact between first surface 21 of base 20 and second side 222 of moveable member 220.

Figure 8:
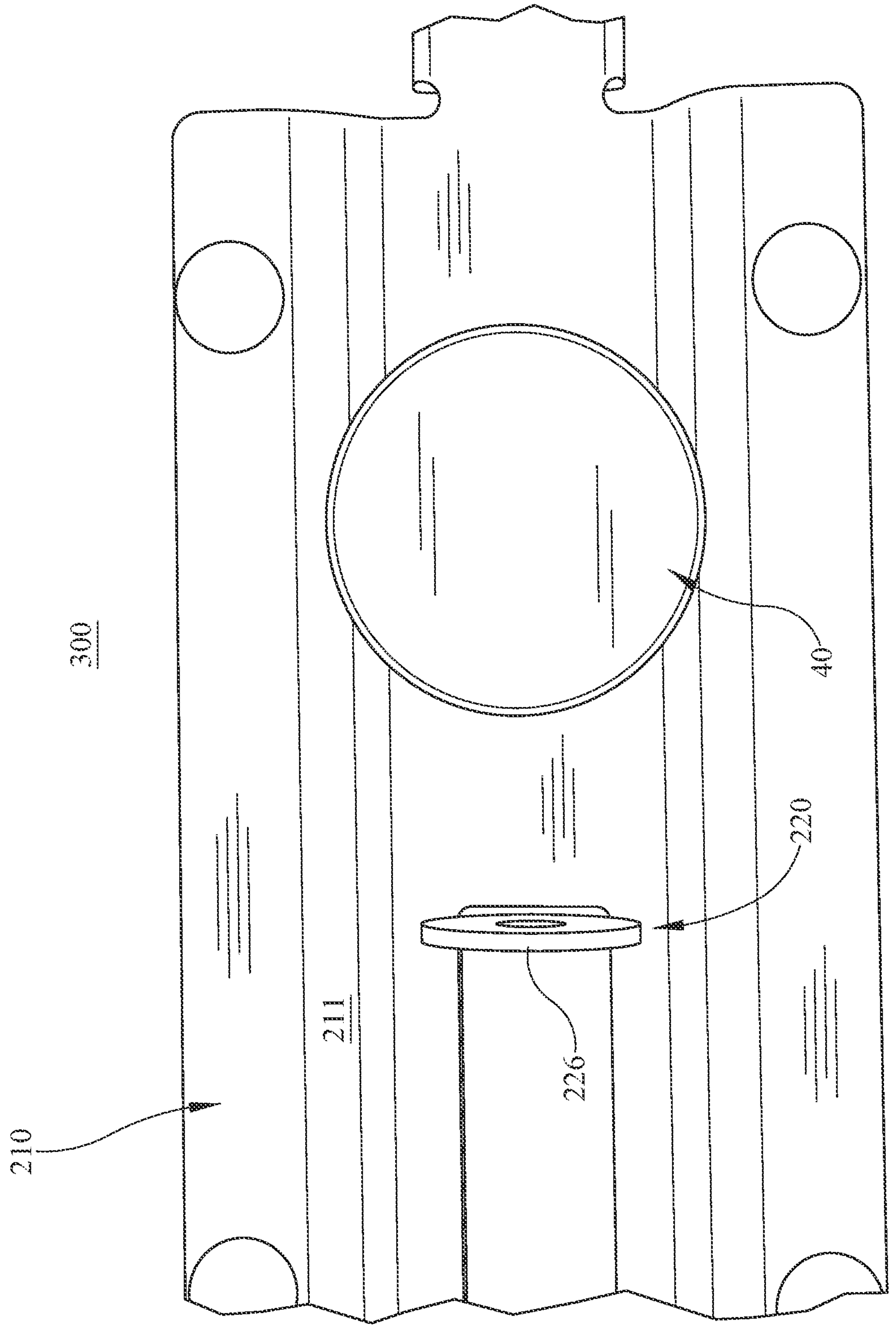
FIG. 8 is a perspective view of the device of FIG. 1 inserted in the latch shown in FIG. 6.
Figure 9:
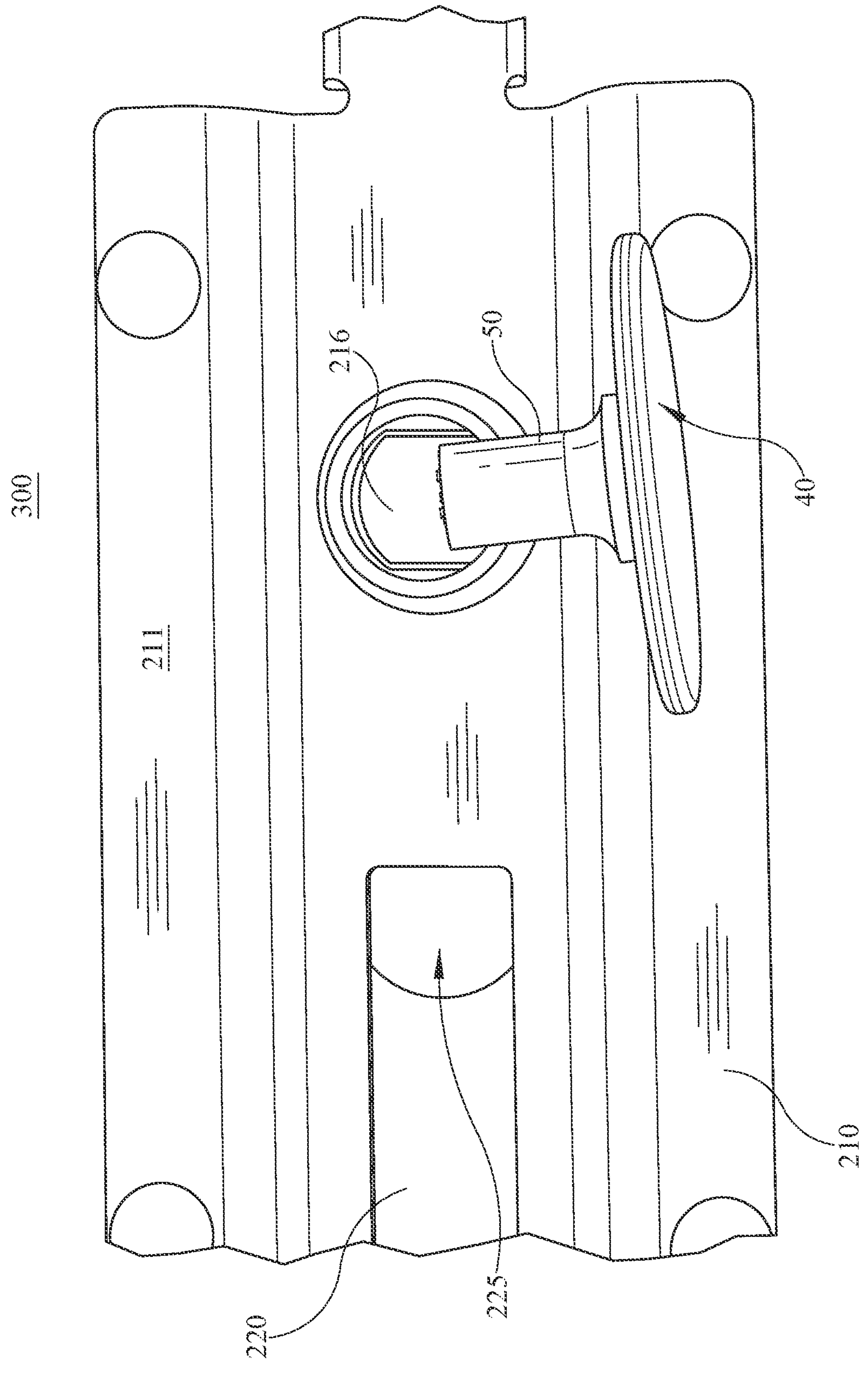
FIG. 9 is a perspective view of the latch shown in FIG. 6 being moved from the engaged or latched position to the opened or unlatched position after the device of FIG. 1 has been inserted in the latch.
Figure 10:
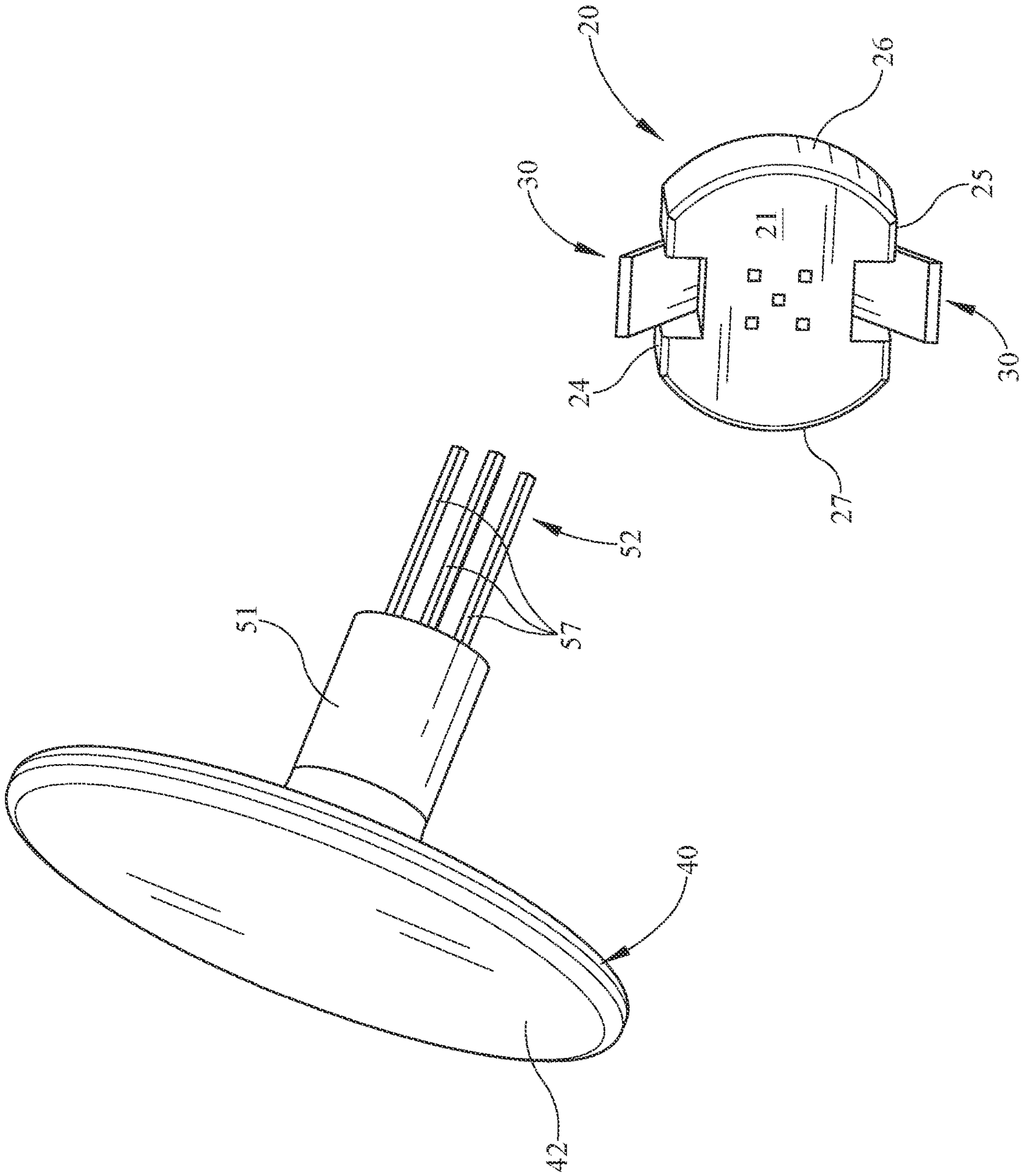
FIG. 10 is a perspective view of the device of FIG. 1 after the latch shown in FIG. 6 has been moved from the engaged or latched position to the opened or unlatched position as shown in FIG. 9.

FIG. 8 shows device 10 inserted in latch 200. In this position, at least a portion of second section 52 of body 20 is positioned in openings 216 and 225. Moving latch 200 from the engaged or latched position shown in FIG. 6 to the opened or unlatched position shown in FIG. 7 will cause perimeter 227 of opening 225 of moveable member 220 to contact and break or otherwise sever the frangible portion of second section 52 of body 50. For example, in the embodiment shown, contact between perimeter 227 of opening 225 and second section 52 of body 50 will break members 57, thereby separating base 20 from head 40 as shown in FIGS. 9 and 10. This separation causes base 20 and/or head 40 to disengage from latch 200, and, for example, fall to the ground under the force of gravity, thereby providing a visual indication that latch 200 has been opened or tampered with. Alternatively, head 40 would also separate from base 20 if one were to pull, twist or otherwise apply sufficient force to head 40 to remove device 10 from latch 200 without moving latch 200 to the opened or unlatched position.

Figure 11:
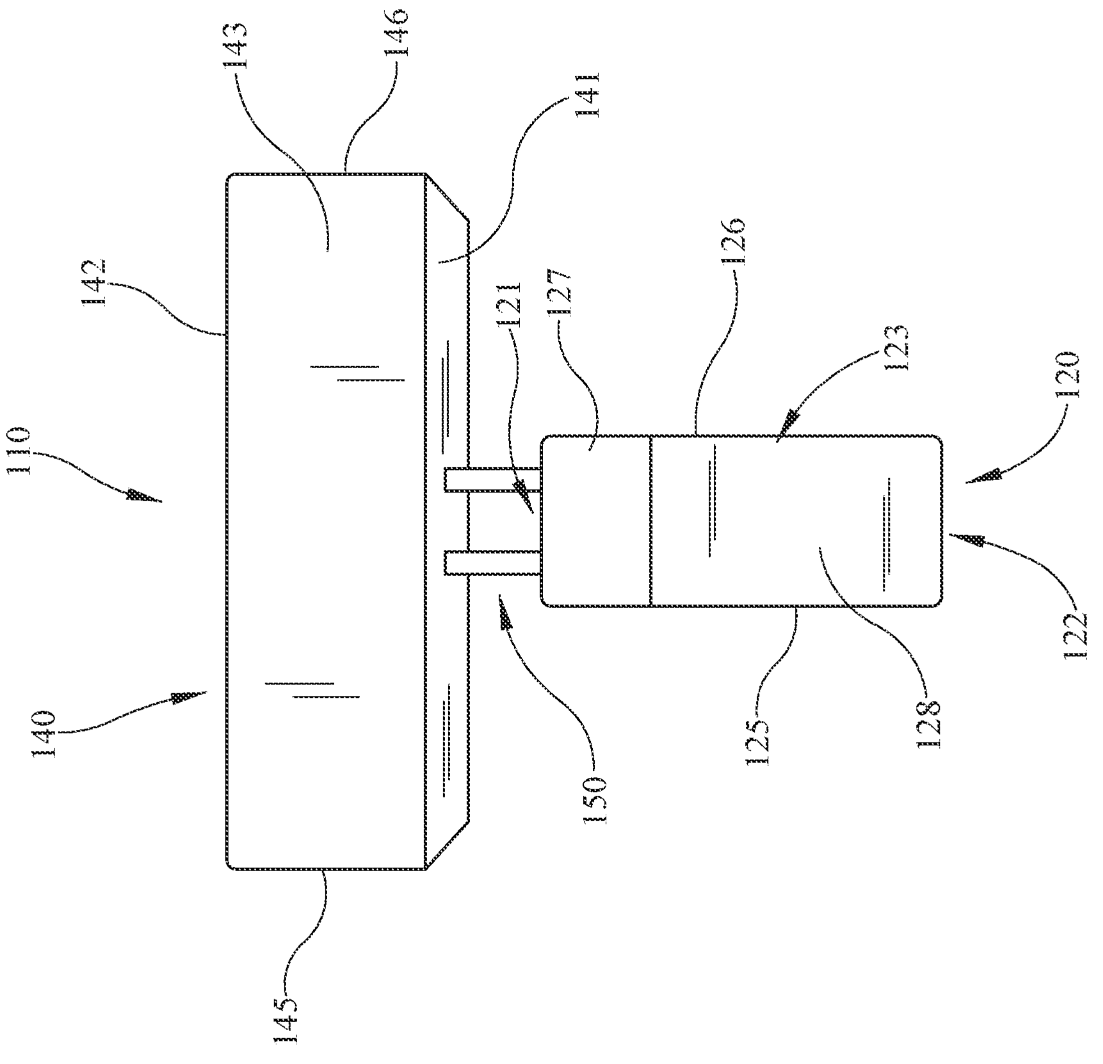
FIG. 11 is a perspective view of a device for indicating that a latch has been opened or tampered with according to another embodiment of the present invention.
Figure 12:
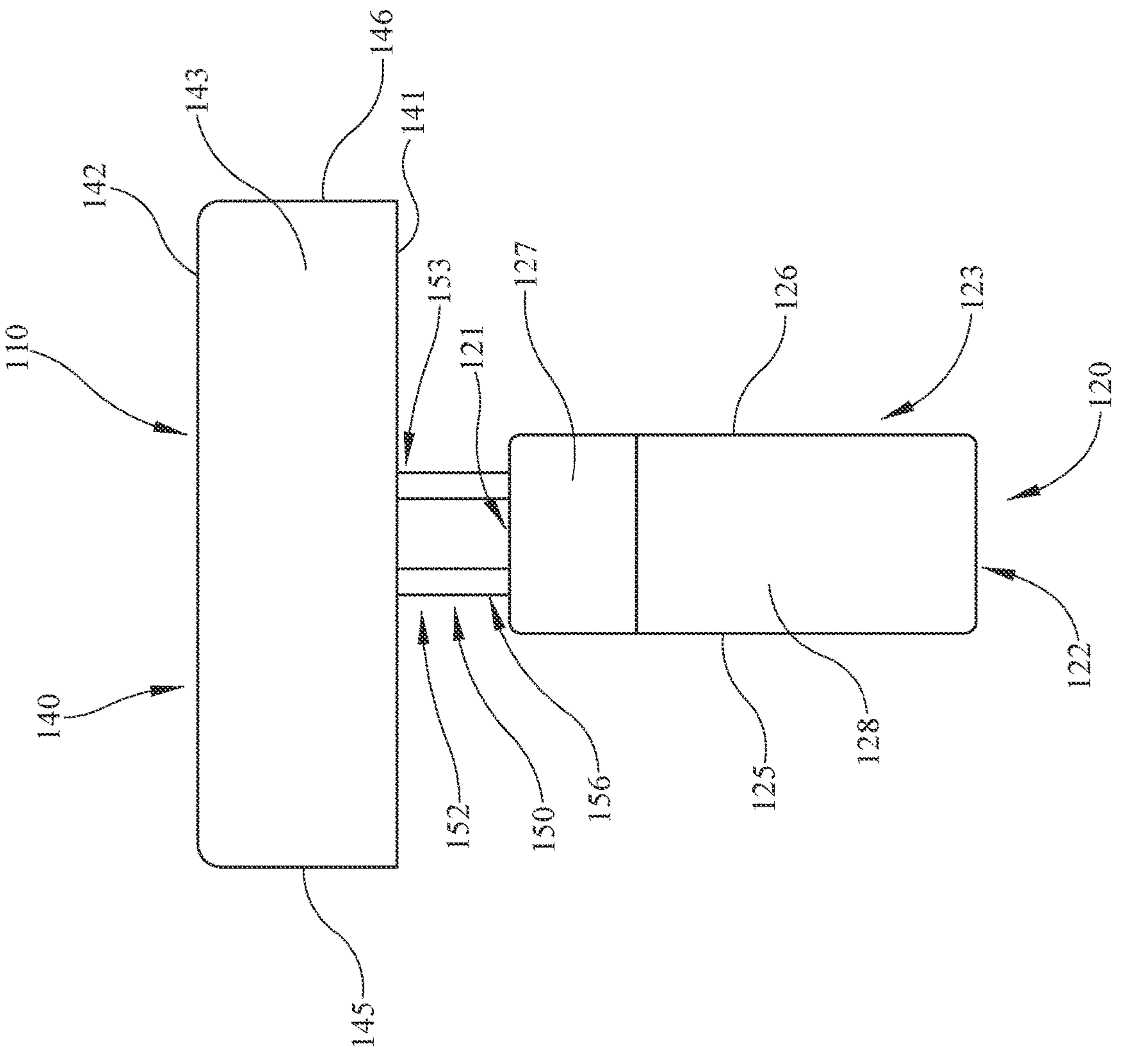
FIG. 12 is an elevational view of the device shown in FIG. 11.
Figure 13:
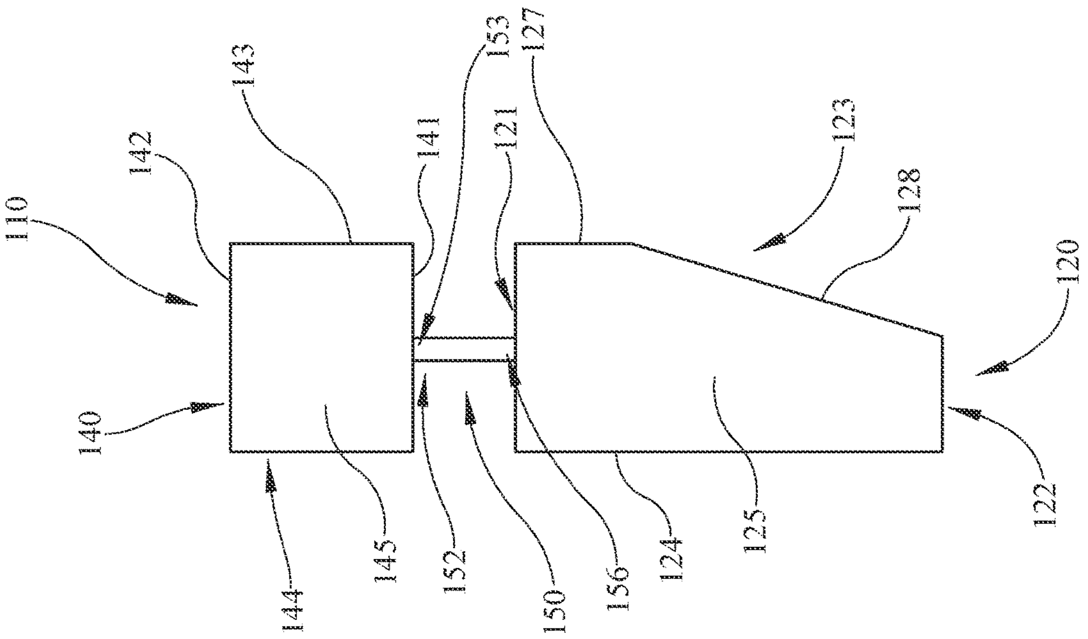
FIG. 13 is an elevational view of the device shown in FIG. 11 rotated 90 degrees relative to FIG. 12.
Figure 14:
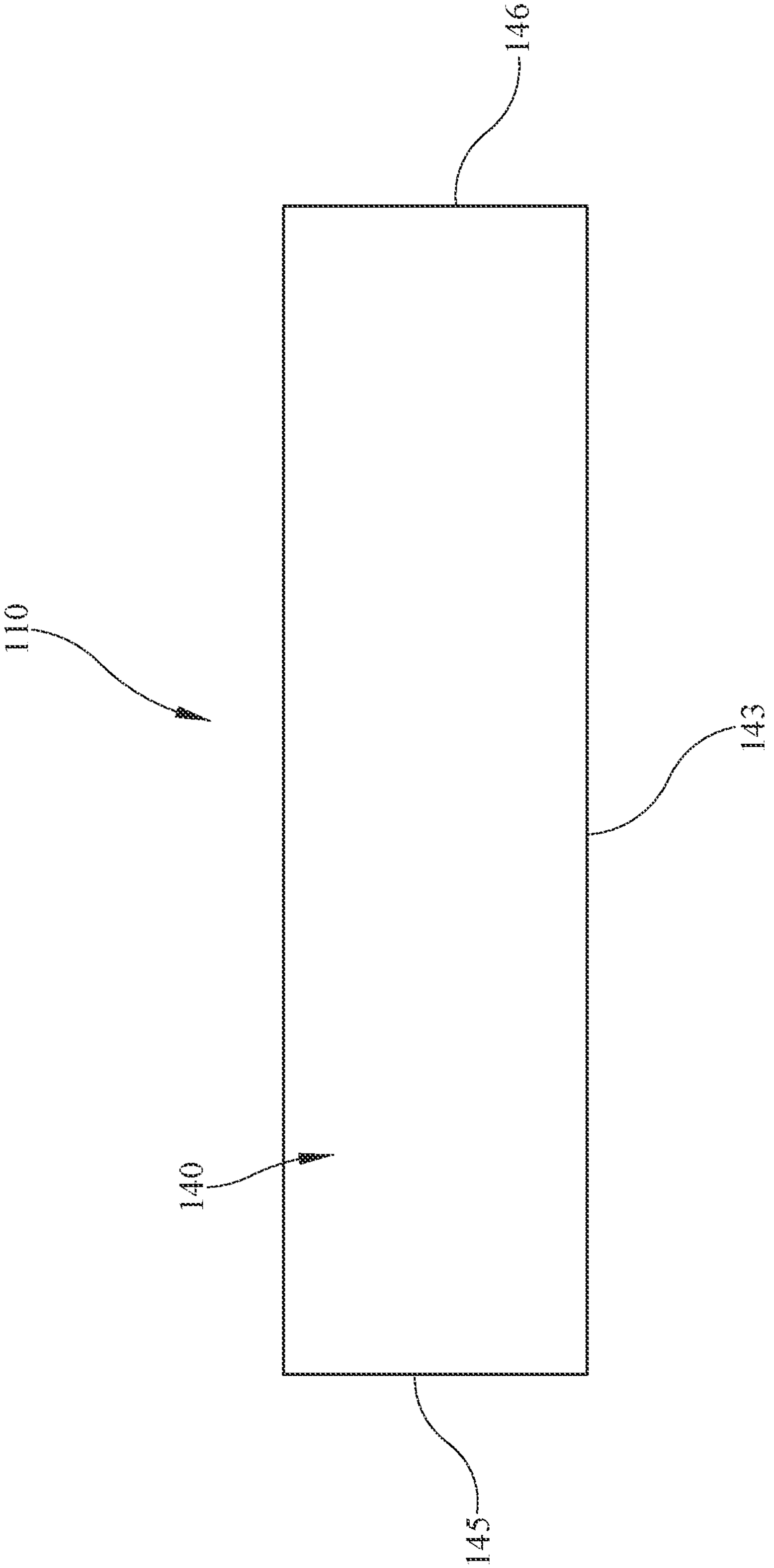
FIG. 14 is a top plan view of the device shown in FIG. 11.
Figure 15:
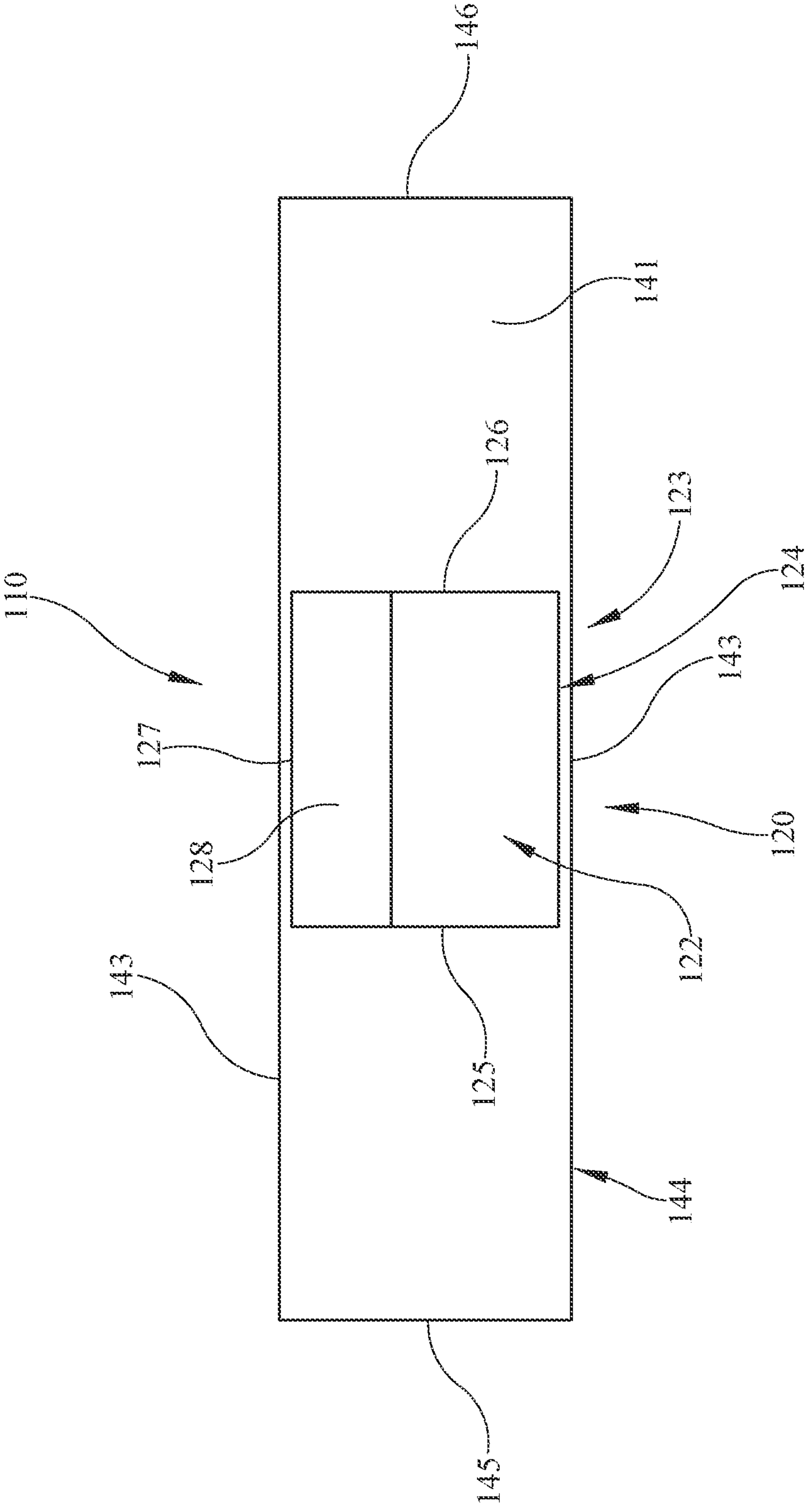
FIG. 15 is a bottom plan view of the device shown in FIG. 11.

FIG. 11 is a perspective view of a device 110 for indicating that a latch has been opened or tampered with according to another embodiment of the present invention. In the embodiment shown, device 110 generally includes a base 120, a head 140, and a body 150.

In the embodiment shown, base 120 includes a first surface 121, a second surface 122, a first side wall 123, a second side wall 124, a third side wall 125, and a fourth side wall 126. First surface 121 is parallel to second surface 122. First side wall 123 in the embodiment shown has a first section 127 that is parallel with second side wall 124 and perpendicular to third side wall 125 and fourth side wall 126, and a second section 128 that extends at an angle from first section 127 to second surface 122 of base 120. Body 120 is constructed from a compressible material.

In the embodiment shown, head 140 includes a first surface 141, a second surface 142, a first side wall 143, a second side wall 144, a third side wall 145 and a fourth side wall 146. First surface 141 is parallel to second surface 142. At least one of first surface 141 and second surface 142 of head 140 has an area greater than at least one of first surface 121 or second surface 122 of base 120. In the embodiment shown both first surface 141 and second surface 142 of head 140 have a larger area than both first surface 121 and second surface 122 of base 120.

In the embodiment shown, body 150 has a section 152 having a first end 153 connected to first surface 141 of head 140 and a second end 156 connected to first surface 121 of base 120. Section 152 of body 150 is frangible. In the embodiment show, section 152 of body 150 is a plurality of thin, elongated members or posts 157, each of which has a first end 158 connected to first surface 141 of head 140 and a second end 159 connected to first surface 121 of base 120.

Figure 16:
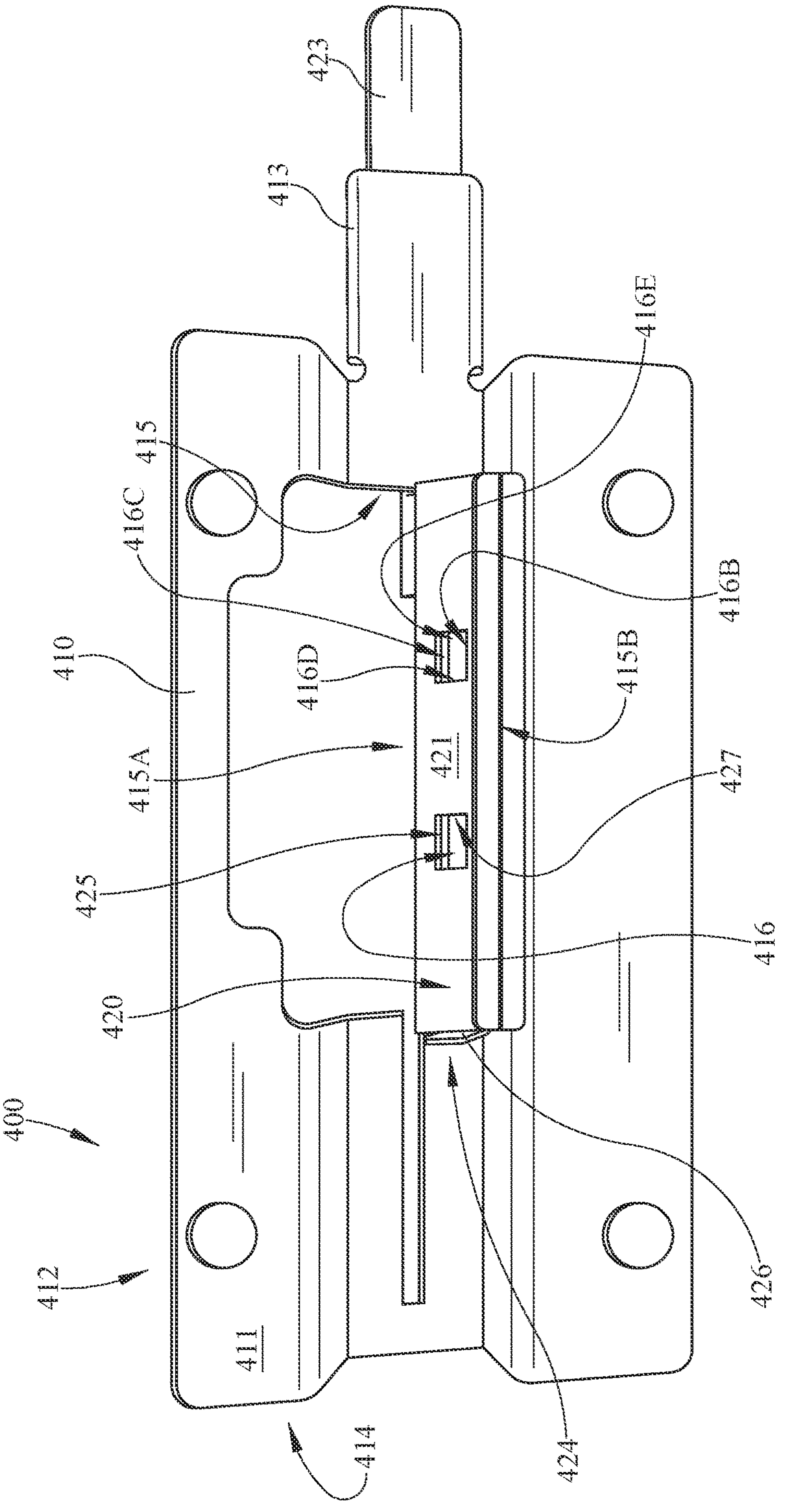
FIG. 16 is a perspective view of another latch in the engaged or latched position.
Figure 17:
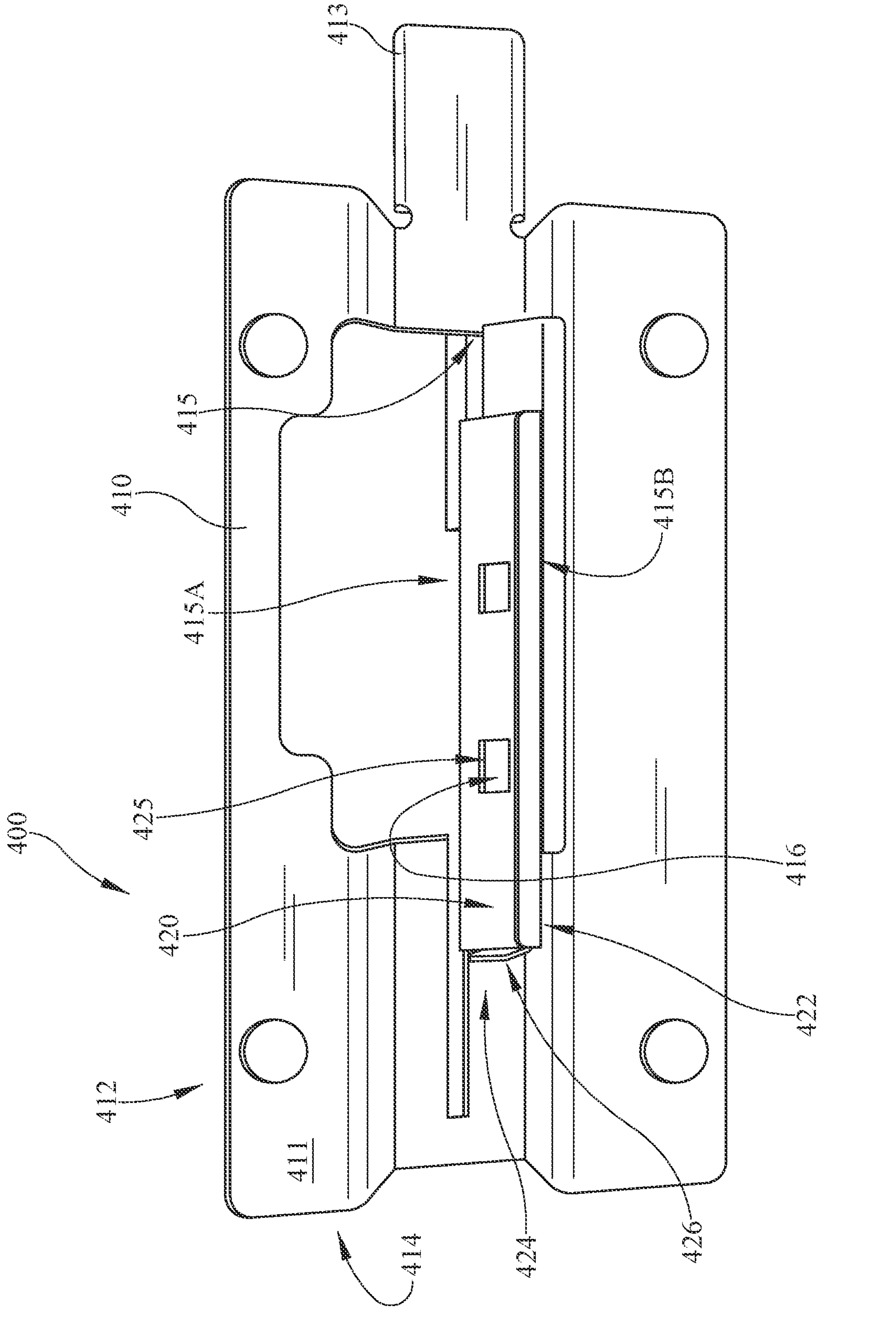
FIG. 17 is a perspective view of the latch shown in FIG. 16 in the opened or unlatched position.

FIG. 16 is a perspective view of a latch 400 in the engaged or latched position. FIG. 17 is a perspective view of latch 400 in the opened or unlatched position. Latch 400 generally includes a first or fixed member 410 and a second or moveable member 420.

Fixed member 410 of latch 400 has a first side 411, a second side 412, a first end 413, a second end 414, a slot or channel 415, and one or more openings 416. Second side 412 of fixed member 410 may be mounted or connected to a surface 300 of a vehicle, building, or other item. Channel 415 includes has a first surface 415A and a second surface 415B. Each opening 416 has a perimeter 416A having a first side 416B, a second side 416C, a third side 416D and a fourth side 416E.

Moveable member 420 has a first side 421, a second side 422, a first end 423, a second end 424, and one or more openings 425. Second end 424 of moveable member 420 has a tab or handle 426. Each opening 425 has an edge or perimeter 427. Moveable member 420 is sized and configured to fit in or on and slide in channel 415 of fixed member 410 between the engaged or latched position shown in FIG. 16 to the opened or unlatched position shown in FIG. 17.

In the engaged or latched position shown in FIG. 16, first end 423 of moveable member 420 extends beyond first end 413 of fixed member 410 and into a retaining structure 301 on a surface 302 adjoining surface 300. In this position, engagement of moveable member 420 with retaining structure 301 prevents movement of surface 300 and surface 302 relative to one another. At least one opening 416 in fixed member 410 and at least one opening 425 in moveable member 420 are aligned when latch 400 is in the engaged or latched position shown in FIG. 16.

Latch 400 may be opened or unlatched by sliding moveable member 420 toward second end 414 of fixed member 410. This may be accomplished by, for example pulling or pushing handled 426 of moveable member 420 toward second end 414 of fixed member 410. In this position, first end 423 of moveable member 420 is disengaged from retaining structure 301 and opening 416 in fixed member 410 and opening 425 in moveable member 420 are no longer aligned.

To use device 110, latch 400 is placed in the engaged or latched position shown in FIG. 16. Device 110 is then positioned such that base 120 is adjacent one of the pair of aligned openings 416 and 425 on first side 421 of moveable member 420, with first side wall 123 and a second side wall 124 aligned with first side 416B and second side 416C of the corresponding opening 416, and with third side wall 125 and a fourth side wall 126 aligned with third side 416D and fourth side 416E of the corresponding opening 416. The area of at least first surface 121 of base 120 is greater than the area of at least one of openings 416 and 425.

After positioning device 110, base 120 is inserted through opening 425 in moveable member 420 and opening 416 in fixed member 410. As base 120 is inserted through openings 425 and 416, one or more of first side wall 123, second side wall 124, third side wall 125, and fourth side wall 126 contacts perimeter 427 of opening 425 and/or perimeter 416A of opening 416. This contact compresses body 120, allowing it to pass through openings 425 and 416. When first surface 121 clears perimeter 416A of opening 416, body 120 expands to its original, uncompressed size. Attempting to remove device 100 from latch 400 by pulling base 120 back through openings 425 and 416 will be prevented by contact between surface 121 and side 415B of channel 415 of fixed member 410.

Figure 18:
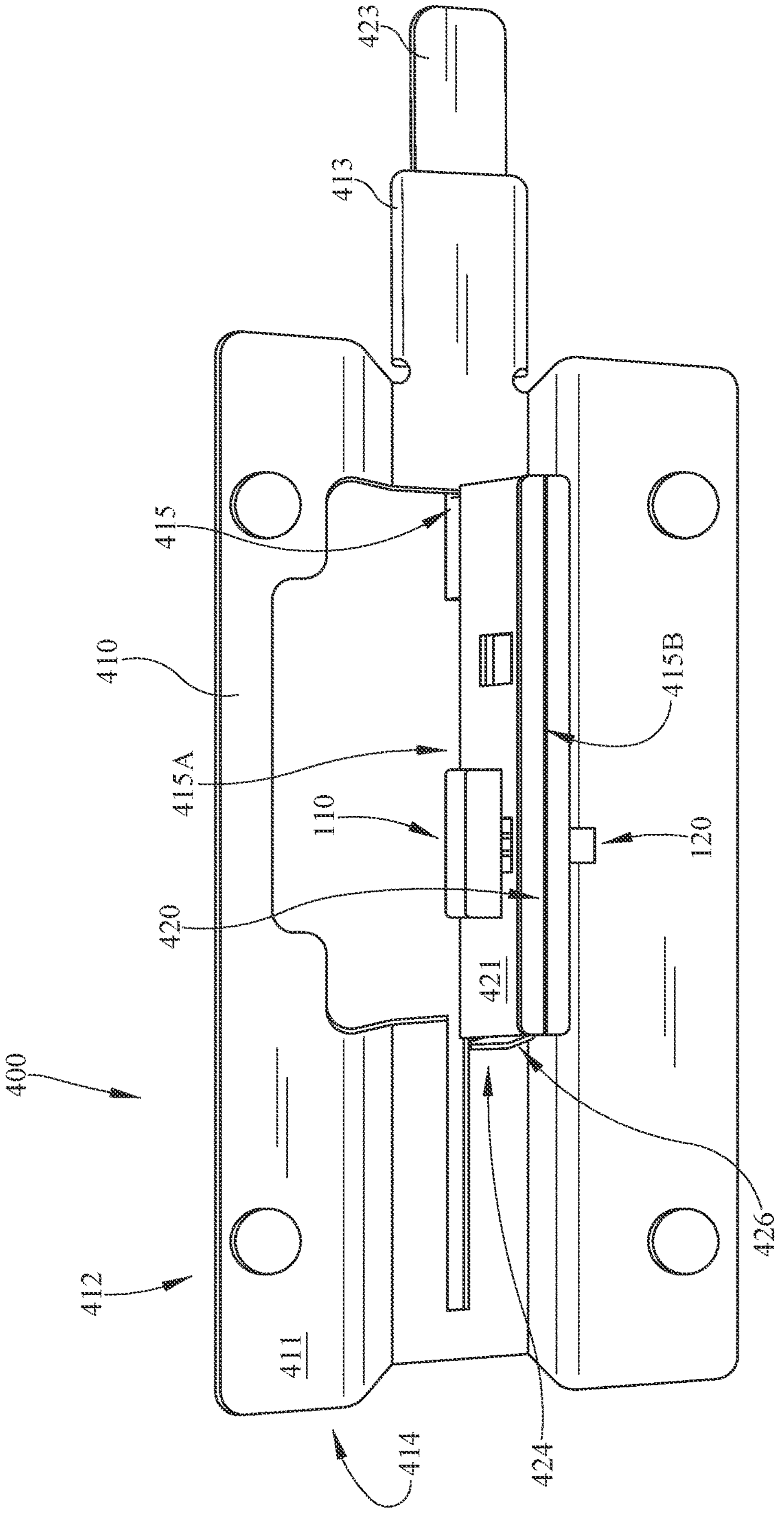
FIG. 18 is a perspective view of the device of FIG. 11 inserted in the latch shown in FIG. 16.
Figure 19:
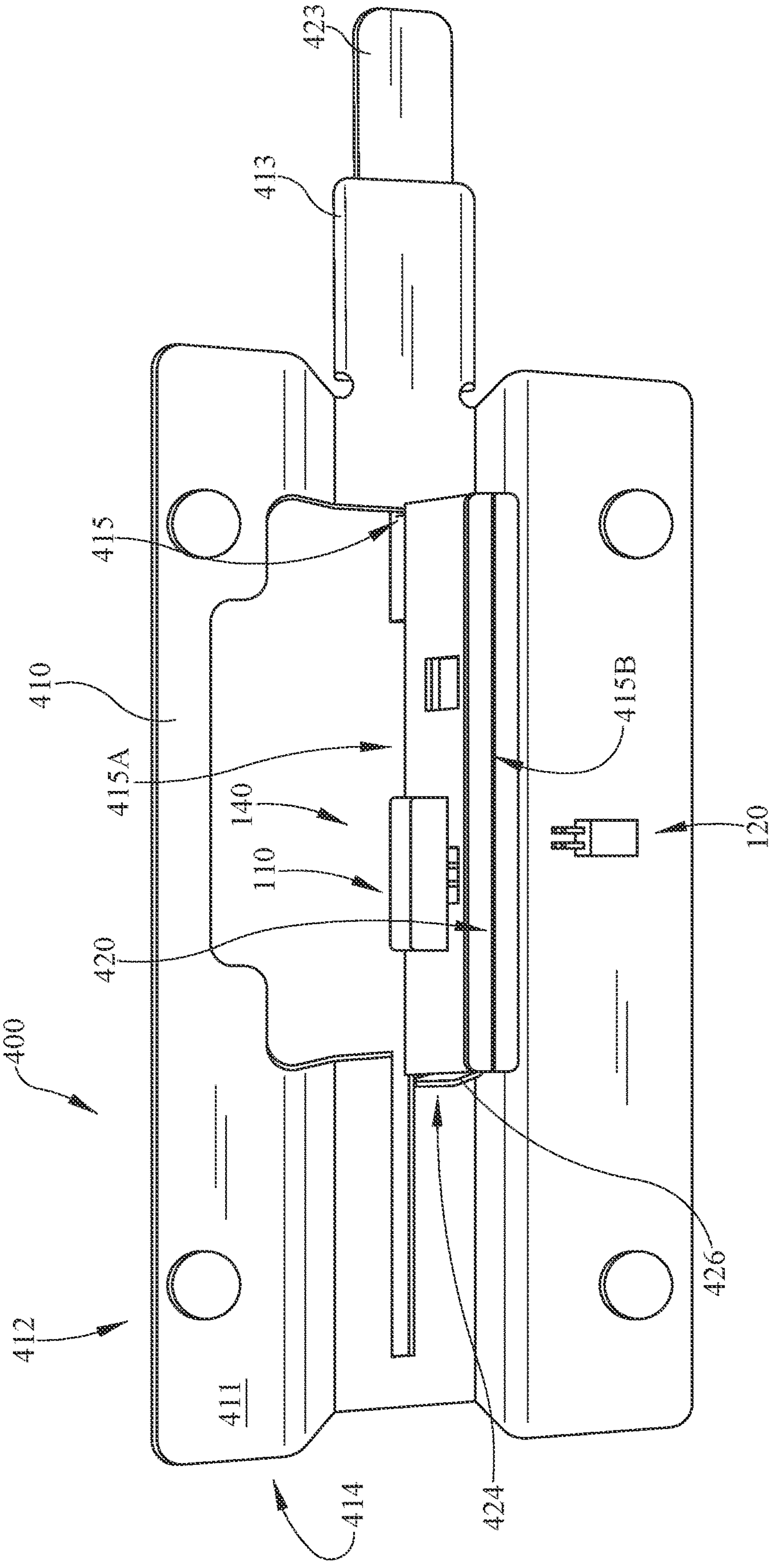
FIG. 19 is a perspective view of the latch shown in FIG. 16 being moved from the engaged or latched position to the opened or unlatched position after the device of FIG. 11 has been inserted in the latch.
Figure 20:
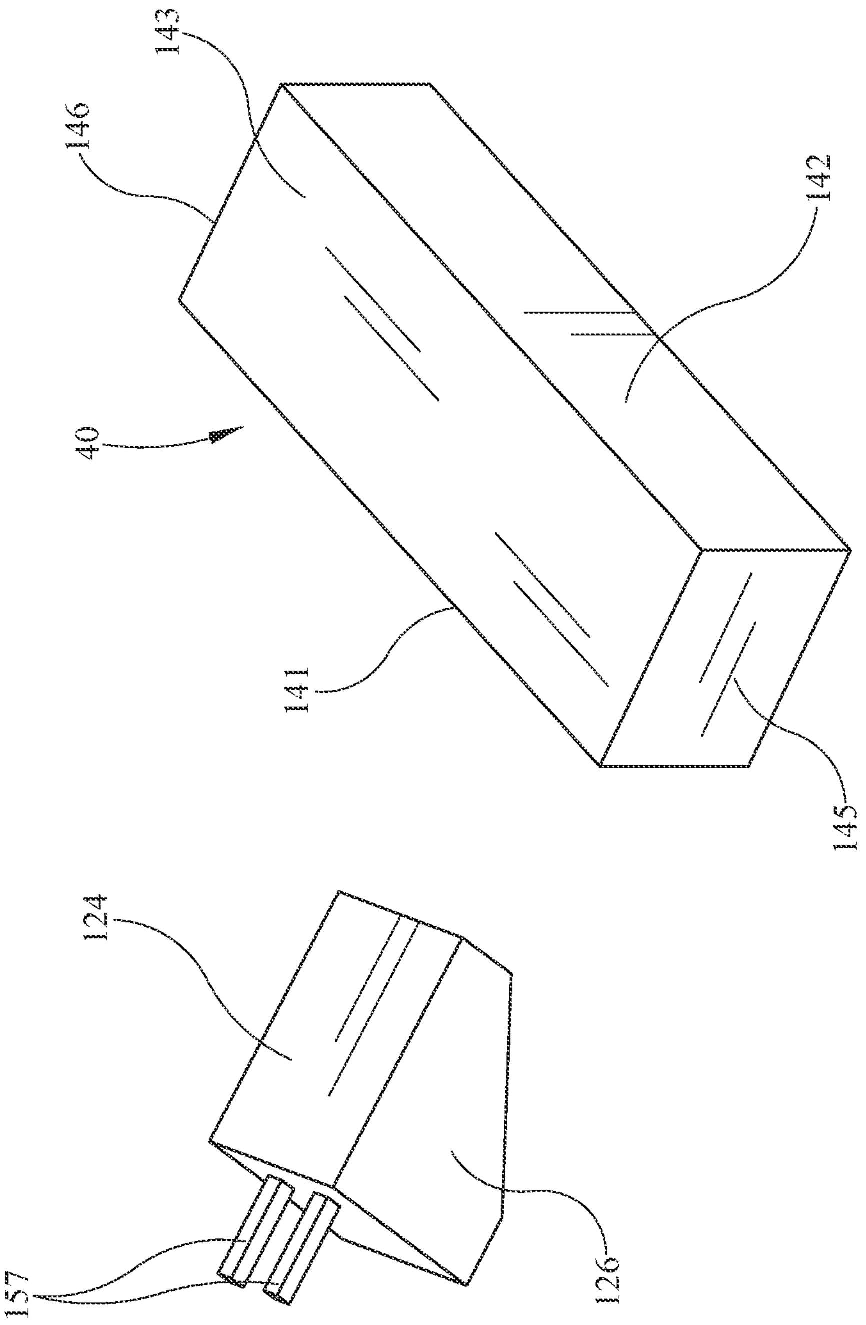
FIG. 20 is a perspective view of the device of FIG. 11 after the latch shown in FIG. 16 has been moved from the engaged or latched position to the opened or unlatched position as shown in FIG. 19.
Figure 21:
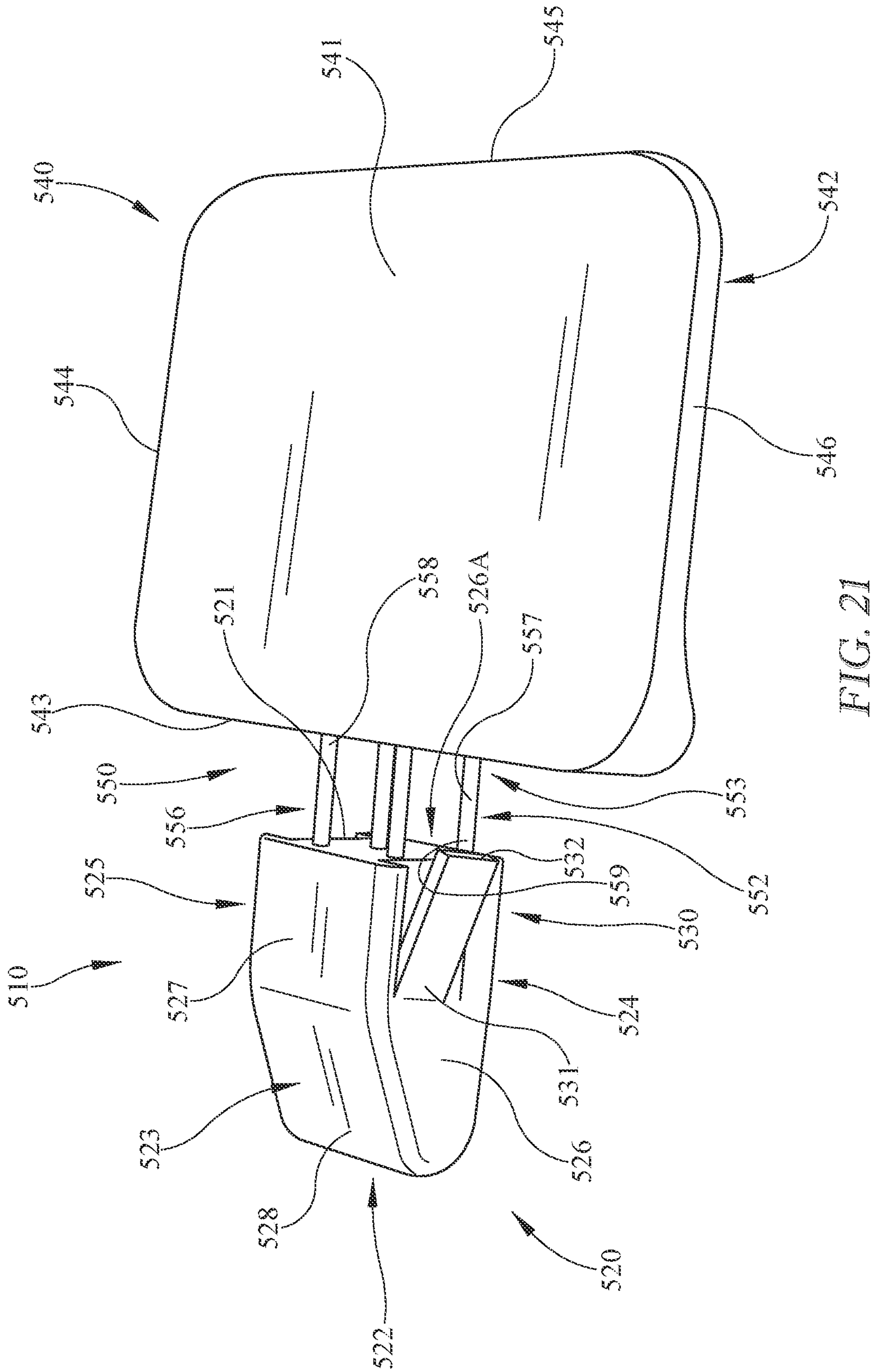
FIG. 21 is a perspective view of a device for indicating that a latch has been opened or tampered with according to another embodiment of the present invention.
Figure 22:
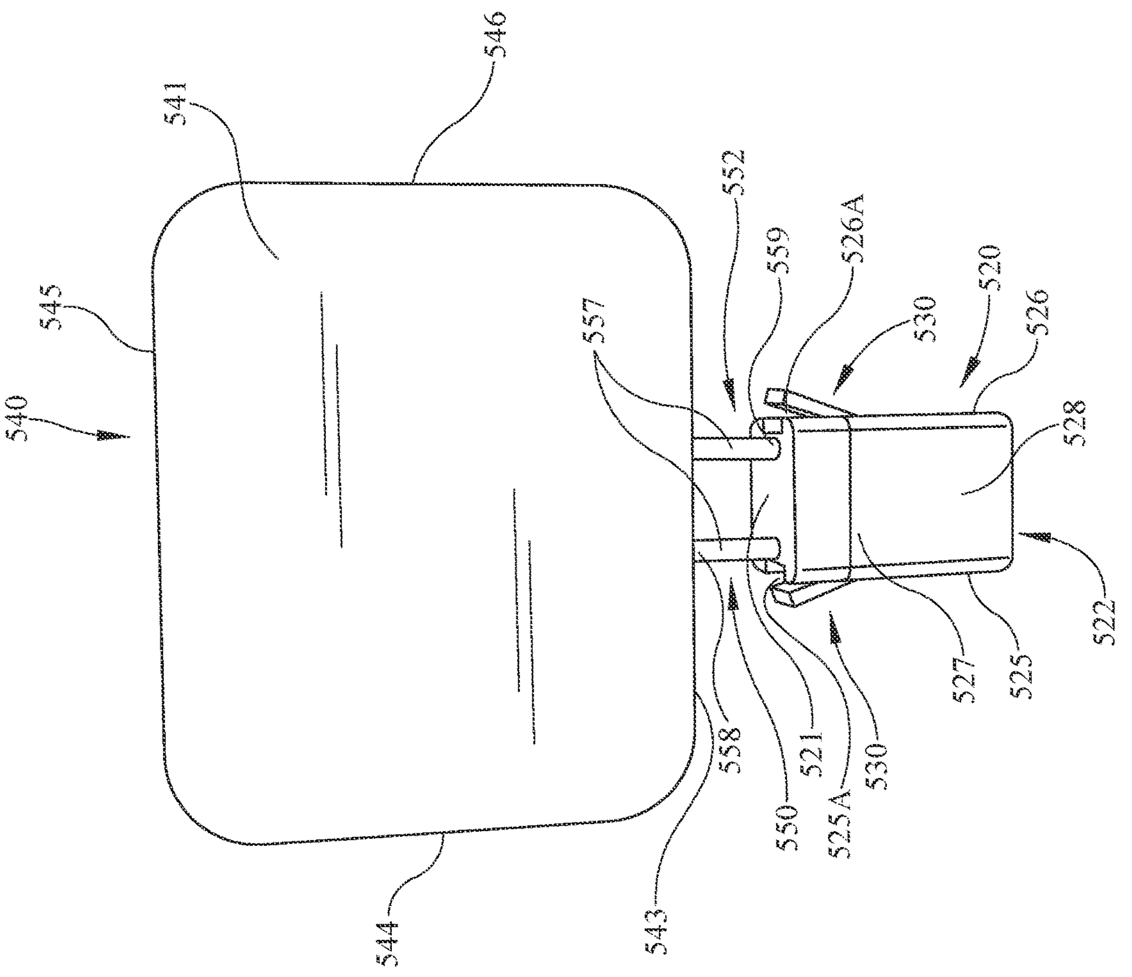
FIG. 22 is a top plan view of the device of FIG. 21.

FIG. 18 shows device 110 inserted in latch 400. In this position, section 152 of body 150 is positioned in openings 416 and 425. Moving latch 400 from the engaged or latched position shown in FIG. 16 to the opened or unlatched position shown in FIG. 17 will cause perimeter 427 of opening 425 of moveable member 420 to contact and break or otherwise sever the frangible portion of section 152 of body 150. For example, in the embodiment shown, contact between perimeter 427 and section 152 of body 150 will break members 157, thereby separating base 120 from head 140 as shown in FIGS. 19 and 20. This separation causes base 120 and/or head 140 to disengage from latch 400, and, for example, fall to the ground under the force of gravity, thereby providing a visual indication that latch 400 has been opened. Alternatively, head 140 would also separate from base 120 if one were to pull, twist or otherwise apply sufficient force to head 140 to remove device 110 from latch 400 without moving latch 400 to the opened or unlatched position FIGS. 21 and 22 illustrate a device 510 for indicating that a latch has been opened or tampered with according to another embodiment of the present invention. In the embodiment shown, device 510 generally includes a base 520, retaining members 530, a head 540, and a body 550.

In the embodiment shown, base 520 includes a first surface 521, a second surface 522, a first side wall 523, a second side wall 524, a third side wall 525, and a fourth side wall 526. Second surface 522 in the embodiment shown is curved. First side wall 523 in the embodiment shown has a first section 527 that is parallel with second side wall 524 and perpendicular to third side wall 525 and fourth side wall 526, and a second section 528 that extends at an angle from first section 527 to second surface 522 of base 520. Third side wall 525 has a recessed area or notch 525A, and fourth side wall 526 has a recessed area or notch 526A.

In the embodiment shown, each retaining member 530 extends from one of either third side wall 525 or fourth side wall 526 of base 520. Each retaining member 530 includes a first end 531 connected to one of third side wall 525 or fourth side wall 526 in or at notches 525A or 526A and a second or free end 532. Retaining members 530 are resilient members. Force can be applied to retaining members 530 to push them toward base 520 and, in the embodiment shown, toward notches 525A and 526A. When the force is removed, retaining members 530 will return to their original position shown in FIGS. 21 and 22.

In the embodiment shown, head 540 includes a first surface 541, a second surface 542, a first side 543, a second side 544, a third side 545 and a fourth side 546. First surface 541 is parallel to second surface 542.

In the embodiment shown, body 550 has a section 552 having a first end 553 connected to first side 543 of head 540 and a second end 556 connected to first surface 521 of base 520. Section 552 of body 550 is frangible. In the embodiment shown, section 552 of body 550 is a plurality of thin, elongated members or posts 557, each of which has a first end 558 connected to first side 543 of head 540 and a second end 559 connected to first surface 521 of base 520.

Device 510 may be used, for example, with latch 400. To do so, latch 400 is placed in the engaged or latched position shown in FIG. 16. Device 510 is then positioned such that base 520 is adjacent one of the pair of aligned openings 416 and 425 on first side 421 of moveable member 420, with first side wall 523 and a second side wall 524 aligned with first side 416B and second side 416C of the corresponding opening 416, and with third side wall 525 and a fourth side wall 526 aligned with third side 416D and fourth side 416E of the corresponding opening 416.

After positioning device 510, base 520 is inserted through opening 425 in moveable member 420 and opening 416 in fixed member 410. As base 520 is inserted through openings 425 and 416, retaining members 530 contact perimeter 427 of opening 425 and/or perimeter 416A of opening 416. This contact compresses retaining members 530 toward base 520. When retaining members 30 clear perimeter 427 of opening 425 and/or perimeter 416A of opening 416, they return to their original position with second ends 532 spaced apart from base 520. Attempting to remove device 500 from latch 400 by pulling base 520 back through openings 425 and 416 will be prevented by contact between surface 521 and side 415B of channel 415 of fixed member 410.

Moving latch 400 from the engaged or latched position as described above will cause perimeter 427 of opening 425 of moveable member 420 to contact and break or otherwise sever the frangible portion of section 552 of body 550. For example, in the embodiment shown, contact between perimeter 427 and section 552 of body 550 will break members 557, thereby separating base 520 from head 540. This separation causes base 520 and/or head 540 to disengage from latch 400, and, for example, fall to the ground under the force of gravity, thereby providing a visual indication that latch 400 has been opened. Alternatively, head 540 would also separate from base 520 if one were to pull, twist or otherwise apply sufficient force to head 540 to remove device 510 from latch 400 without moving latch 400 to the opened or unlatched position.

Although the present invention has been shown and described in detail, the same is to be taken by way of example only and not by way of limitation. Numerous modifications can be made to the embodiments disclosed without departing from the scope of the present invention. For example, bases 20, 120, and 520 can have configurations other than those shown and described. The shape of base 20, base 120, and base 520 can be chosen based on the configuration of the latch with which devices according to the present invention are intended to be used. Second section 52 of body 50, section 152 of body 150, and section 552 of body 520 can be constructed such that only a portion is frangible. The number of posts 57, 157, and 557 can be varied from the numbers shown, and their arrangement with respect to one another can also be varied. Also, the positioning of first section 51 and second section 52 could be reversed, so that one end of first section 51 is connected to base 20 and one end of second section 52 is connected to head 40. As another alternative, the embodiment of FIGS. 1-10 could utilize a base 20 that is compressible and retaining members 30 can be eliminated. Similarly, base 120 can be provided with retaining members the same as or similar to retaining members 30. Base 20, 120, and 520 can be compressible or not compressible, regardless of whether or not they include retaining members, such as retaining members 30 or 530. Devices 110 and 510 could be inserted through openings 416 and 425 from beneath latch 400 such that body 120 and body 520 pass first through opening 416 and then through opening 425. Other modifications and variations are also within the scope of the present invention.

What is claimed is:

1. A device for indicating that a latch has been opened or tampered with, including:

a base, the base having a first surface, a second surface, and a wall extending from the first surface to the second surface, the wall having a curved section and a flat section;

a first retaining member extending from the base and a second retaining member extending from the base and located across the base from and directly opposite the first retaining member;

a head having a first surface and a second surface opposite the first surface, at least one of the first surface of the head and the second surface of the head having an area larger than at least one of the first surface of the base or the second surface of the base;

a body having a first section having a first end and a second end and a second section having a first end and a second end, wherein the second section of the body is frangible, the first end of the first section of the body is connected to the first surface of the head, the second end of the first section of the body connected to the first end of the second section of the body, and the second end of the second section of the body is connected to the first surface of the base; and wherein the flat section of the wall of the base includes a recessed area, and the first retaining member extends from the recessed area.

2. The device according to claim 1, wherein the curved section of the wall of the base is adjacent the flat section of the wall of the base.

3. The device according to claim 1, wherein the wall of the base further includes a second flat section and a second curved section.

4. The device according to claim 3, wherein the flat sections of the wall of the base are parallel.

5. The device according to claim 1, wherein the first retaining member includes at least one resilient member.

6. The device according to claim 1, wherein the first section of the body has a larger diameter than the second section of the body.

7. The device according to claim 1, wherein the second section of the body includes at least one elongated member.

8. A device for indicating that a latch has been opened or tampered with, the latch having a fixed member having an opening and a moveable member having an opening, the openings being aligned when the latch is in the latched positioned and not aligned when the latch is in the open position, the device including:

a base configured to be inserted through the opening in the fixed member and the opening in the moveable member;

a head;

a body connecting the base to the head, the body having a frangible section positioned relative to the base and the head so as to be located in the opening of the fixed member and the opening of the moveable member when the base is inserted through the opening in the fixed member and the opening in the moveable member;

wherein movement of the moveable member transverse to the frangible section of the body to move the latch from the latched position to the open position causes the moveable member to break the frangible section and separate the base from the head; and wherein the base has a first surface, a second surface, a wall extending from the first surface to the second surface, the wall having a first curved section and a second curved section, a first notch formed in the wall of the base between the first curved section and the second curved section, a second notch formed in the wall of the base and located between the first curved section and the second curved section and directly opposite the first notch, a first flat section in the first notch, a second flat section in the second notch, a first retaining member located in the first notch, and a second retaining member located in the second notch.

9. The device according to claim 8, wherein the head is larger than the opening in the fixed member and the opening in the moveable member.

10. The device according to claim 8, wherein the second surface of the base is farther from the head than is the first surface of the base, and wherein the first retaining member extends from the first flat section and from within the first notch at an angle to the first flat surface.

11. The device according to claim 8, wherein:

the opening in the fixed member has a first curved section, a second curved section opposite the first curved section, a first flat section between the first curved section and the second curved section, and a second flat section between the first curved section and the second curved section and opposite the first flat section;

the opening in the moveable member has a first curved section, a second curved section opposite the first curved section, a first flat section between the first curved section and the second curved section, and a second flat section between the first curved section and the second curved section and opposite the first flat section;

the second curved section is opposite the first curved section, a third flat section between the first curved section and the second curved section, and a fourth flat section between the first curved section and the second curved section and opposite the first flat section; and wherein the device is retained in the opening in the fixed member and the opening in the moveable member when the latch is in the latched position by aligning the third and fourth flat sections of the base with the flat sections of the openings, aligning the curved sections of the base with the curved sections of the openings, inserting the base through the openings, and rotating the base until the third and fourth flat sections of the base and the openings and the curved sections of the base and the openings are at least partially misaligned.

12. A device for indicating that a latch has been opened or tampered with, the latch having a fixed member having an opening and a moveable member having an opening, the openings being aligned when the latch is in the latched positioned and not aligned when the latch is in the open position, the device including:

a base configured to be inserted through the opening in the fixed member and the opening in the moveable member;

a head;

a body connecting the base to the head, the body having a frangible section positioned relative to the base and the head so as to be located in the opening of the fixed member and the opening of the moveable member when the base is inserted through the opening in the fixed member and the opening in the moveable member;

wherein movement of the moveable member transverse to the frangible section of the body to move the latch from the latched position to the open position causes the moveable member to break the frangible section and separate the base from the head; and wherein the opening in the fixed member has a first curved section, a second curved section opposite the first curved section, a first flat section between the first curved section and the second curved section, and a second flat section between the first curved section and the second curved section and opposite the first flat section;

the opening in the moveable member has a first curved section, a second curved section opposite the first curved section, a first flat section between the first curved section and the second curved section, and a second flat section between the first curved section and the second curved section and opposite the first flat section;

the base has a first surface, a second surface, a wall extending from the first surface to the second surface, the wall having a first curved section, a second curved section opposite the first curved section, a first flat section between the first curved section and the second curved section, and a second flat section between the first curved section and the second curved section and opposite the first flat section; and the device is retained in the opening in the fixed member and the opening in the moveable member when the latch is in the latched position by aligning the flat sections of the base with the flat sections of the openings, aligning the curved sections of the base with the curved sections of the openings, inserting the base through the openings, and rotating the base until the flat sections of the base and the openings and the curved sections of the base and the openings are at least partially misaligned.

13. The device according to claim 12, further including a first notch formed in the wall of the base between the first curved section and the second curved section, a second notch formed in the wall of the base and located between the first curved section and the second curved section and directly opposite the first notch, a first flat section in the first notch, a second flat section in the second notch, a first retaining member located in the first notch, and a second retaining member located in the second notch.

* * * * *